(12) United States Patent
Morard et al.

(10) Patent No.: US 10,902,137 B2
(45) Date of Patent: Jan. 26, 2021

(54) TECHNIQUES FOR ENABLING A SOFTWARE APPLICATION TO PERFORM AN OPERATION ON A FILE STORED ON A FILE SYSTEM WHILE ENFORCING PRIVACY MEASURES

(71) Applicant: Apple Inc., Cupertino, CA (US)

(72) Inventors: Jean-Gabriel Morard, Chaville (FR); Anthony S. Parker, San Jose, CA (US); Rony Fadel, Paris (FR); Kevin S. Perry, Everett, WA (US)

(73) Assignee: Apple Inc., Cupertino, CA (US)

( * ) Notice: Subject to any disclaimer, the term of this patent is extended or adjusted under 35 U.S.C. 154(b) by 31 days.

(21) Appl. No.: 15/803,663

(22) Filed: Nov. 3, 2017

(65) Prior Publication Data

US 2018/0349623 A1 Dec. 6, 2018

Related U.S. Application Data

(60) Provisional application No. 62/514,877, filed on Jun. 4, 2017.

(51) Int. Cl.
*G06F 21/00* (2013.01)
*G06F 21/62* (2013.01)
*G06F 21/53* (2013.01)

(52) U.S. Cl.
CPC ......... *G06F 21/6209* (2013.01); *G06F 21/53* (2013.01); *G06F 21/6245* (2013.01); *G06F 2221/2149* (2013.01)

(58) Field of Classification Search
CPC ................ G06F 21/6209; G06F 21/53; G06F 2221/2149; G06F 21/6245
See application file for complete search history.

(56) References Cited

U.S. PATENT DOCUMENTS

| | | | |
|---|---|---|---|
| 7,484,245 B1 * | 1/2009 | Friedman | G06F 21/52 380/283 |
| 9,185,088 B1 * | 11/2015 | Bowen | H04L 63/0471 |
| 9,519,802 B2 * | 12/2016 | Dutta | G06F 21/602 |
| 10,025,948 B1 * | 7/2018 | Chou Fritz | G06F 21/6218 |
| 2005/0256943 A1 * | 11/2005 | Morris | H04L 67/34 709/220 |
| 2007/0136794 A1 * | 6/2007 | Chin | H04L 63/0807 726/5 |

(Continued)

*Primary Examiner* — John B King
(74) *Attorney, Agent, or Firm* — Dickinson Wright RLLP

(57) ABSTRACT

This application relates to a technique that enables a software application to perform an operation on a file stored on a file system, while enforcing privacy measures. The technique includes receiving, from a file browser, a selection of file made accessible by a file access service. The file access service is associated with the file system storing the file. The file browser executes in a mode that prevents the software application from identifying content displayed within the file browser. The technique also includes, provided the software application is authorized to access the file, communicating a first list of operations for receipt by the software application, in which the software application selects a first subset of operations, to perform on the file. Furthermore, the technique includes establishing, to perform the first subset of operations on the file, a first direct communication link between the software application and the file access service.

20 Claims, 17 Drawing Sheets

(56) References Cited

U.S. PATENT DOCUMENTS

| | | | |
|---|---|---|---|
| 2013/0304774 A1* | 11/2013 | Tan | H04L 67/1097 |
| | | | 707/827 |
| 2013/0346450 A1* | 12/2013 | Procopio | G06F 21/6218 |
| | | | 707/783 |
| 2018/0052573 A1* | 2/2018 | Comertoglu | G06F 3/0484 |
| 2018/0205632 A1* | 7/2018 | Ranjan | H04L 45/124 |

* cited by examiner

ENUMERATION TABLE 226 ⤺ 224

| FILE ACCESS SERVICE | ROOT LOCATION (HTTP://) | FILE | ITEM ID |
|---|---|---|---|
| FILE ACCESS SERVICE 116-1 | FILE ACCESS SERVICE FOLDER 208 | FILE ACCESS SERVICE FILE 202 | 55 |
| FILE ACCESS SERVICE 116-1 | FILE ACCESS SERVICE FOLDER 208 | FILE ACCESS SERVICE FILE 204 | 56 |
| FILE ACCESS SERVICE 116-1 | FILE ACCESS SERVICE FOLDER 208 | FILE ACCESS SERVICE FILE 206 | 57 |
| ... | ... | ... | ... |

*FIG. 2B*

ENUMERATION TABLE 226

| FILE ACCESS SERVICE | ROOT LOCATION (HTTP://) | FILE | ITEM ID |
|---|---|---|---|
| FILE ACCESS SERVICE 116-1 | FILE ACCESS SERVICE FOLDER 208 | FILE ACCESS SERVICE FILE 202 | 55 |
| FILE ACCESS SERVICE 116-1 | FILE ACCESS SERVICE FOLDER 208 | FILE ACCESS SERVICE FILE 204 | 56 |
| FILE ACCESS SERVICE 116-1 | FILE ACCESS SERVICE FOLDER 208 | FILE ACCESS SERVICE FILE 206 | 57 |
| FILE ACCESS SERVICE 116-2 | FILE ACCESS SERVICE FOLDER 222 | FILE ACCESS SERVICE FILE 216 | 58 |
| FILE ACCESS SERVICE 116-2 | FILE ACCESS SERVICE FOLDER 222 | FILE ACCESS SERVICE FILE 218 | 59 |
| FILE ACCESS SERVICE 116-2 | FILE ACCESS SERVICE FOLDER 222 | FILE ACCESS SERVICE FILE 220 | 60 |
| ... | ... | ... | ... |

*FIG. 2D*

TECHNIQUES FOR ENABLING A SOFTWARE APPLICATION TO PERFORM AN OPERATION ON A FILE STORED ON A FILE SYSTEM WHILE ENFORCING PRIVACY MEASURES

CROSS-REFERENCE TO RELATED APPLICATIONS

The present application claims the benefit of U.S. Provisional Application No. 62/514,877, entitled "TECHNIQUES FOR ENABLING A SOFTWARE APPLICATION TO PERFORM AN OPERATION ON A FILE STORED ON A FILE SYSTEM WHILE ENFORCING PRIVACY MEASURES," filed Jun. 4, 2017, the content of which is incorporated herein by reference in its entirety for all purposes.

FIELD OF INVENTION

The described embodiments relate generally to file selection techniques. More particularly, the present embodiments relate to techniques that can enable a software application to perform an operation on a file selected within a secure file browser that is sandboxed from the software application.

BACKGROUND

Modern third-party applications (e.g., executing on a client computing device) enable users to launch one or more files (e.g., word processing documents, spreadsheets, presentation documents, etc.) stored on a file system (e.g., a local file system, network file system, cloud-based file system, etc.) that is accessible to the client computing device. For instance, using conventional methods of file selection, a third-party application can present a set of files from which a file can be selected by a user, whereupon the file is loaded into the third-party application and can be interacted with by the user.

Notably, conventional methods of file selection fail to provide security measures with respect to the level of access third-party applications should have to files stored on file systems. For instance, conventional methods typically expose all of the files on the file system to a given third-party application during a file selection procedure. In this fashion, the third-party application can potentially obtain access to sensitive data stored on the file system when a file selection procedure is being performed, e.g., data that is completely unrelated to the third-party application. Furthermore, while the need to impose file access security measures on the third-party application is readily apparent, it can be desirable to make full use of any features offered by the third-party application when the third-party application has appropriate access to a particular file on the file system.

SUMMARY

Accordingly, the representative embodiments set forth herein disclose techniques that can enable a software application to perform an operation on a file selected within a secure file browser that is sandboxed from the software application.

One embodiment sets forth a method for enabling a software application to perform an operation on a file stored on a file system while enforcing privacy measures. In particular, the method involves, at the computing device on which the software application executes: (1) receiving, from a file browser, a selection of at least one file of one or more files made accessible by at least one file access service of one or more file access services, in which the at least one file access service is associated with the file system storing the at least one file, and the file browser executes in a mode such that the software application cannot identify any content displayed within the file browser, and in response to determining that the software application is authorized to access the at least one file: (2) communicating a first list of operations for receipt by the software application, in which the software application selects a first subset of operations, to perform on the at least one file, from the first list, and (3) establishing, to perform the first subset of operations on the at least one file, a first direct communication link between the software application and the at least one file access service.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

FIGS. 2A-2E illustrate exemplary user file enumeration procedures that can be performed to enable a software application to perform an operation on a file stored on a file system while enforcing privacy measures, according to some embodiments.

DETAILED DESCRIPTION

Figure 1:
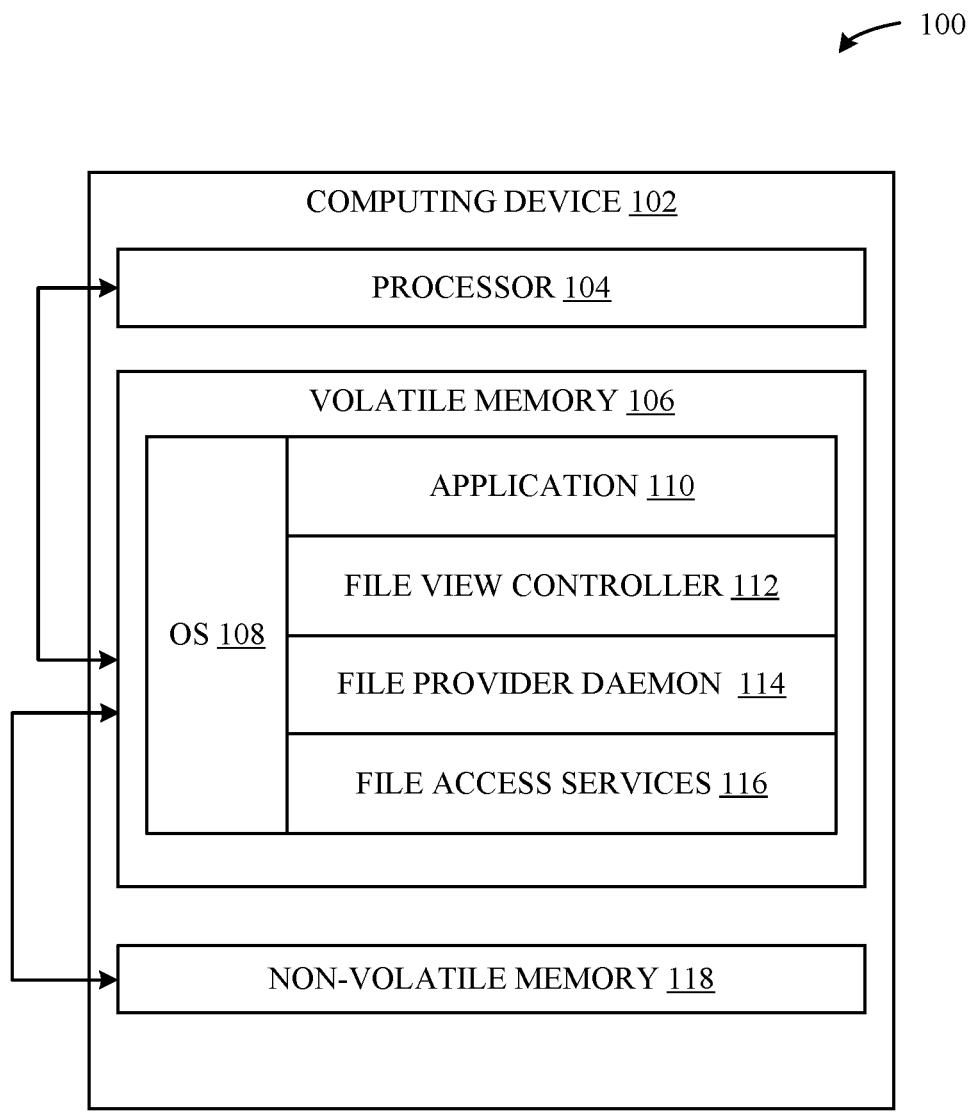
FIG. 1 illustrates an overview of a system that can be configured to perform the various techniques described herein, according to some embodiments.

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Various embodiments set forth herein involve a file provider daemon that maximizes the abilities of a third-party application to perform special operations on a file of interest stored on a file system, while maintaining overall security within the file system. For instance, according to some embodiments, the file provider daemon—which, as described herein, can be configured to operate in a "sandboxed mode"—can be logically disposed between a file browser and one or more file access services (e.g., that permit access to local or cloud data) that are implemented on a given client computing device. In particular, by operating in the sandboxed-mode, the file provider daemon can perform operations in a manner that limits the ability of the software application to freely access one or more files from the file system, thereby ensuring the data integrity of the file system.

According to some embodiments, the file browser can also be configured to operate within a sandboxed-mode to perform file selection procedures on behalf of the third-party application in manner that is not visible to the third-party application. In this fashion, the file browser can enable a user to select a file to be loaded into the third-party application in a manner that does not needlessly expose, to the third-party application, other files that are stored within the file systems made available via the file access services (e.g., a local file system, network file system, cloud-based file system, etc.).

According to some embodiments, each file access service can include the functionality to, based on determinations made by the file provider daemon, enable one or more files stored on a particular file system to be accessed by the third-party application. In this fashion, each file access service can act as a conduit between the file browser and the particular file system. Accordingly, each file access service can, based on determinations made by the file provider daemon, enable the third-party application to access a file of interest selected, via the file browser, from the particular file system.

Additionally, each file access service can also support interfaces that each corresponds to a special operation that can be performed on one or more files associated with the particular file system. For example, special operations can include, but are not limited to, video file playback operations, document collaboration operations that allow multiple individuals to edit a shared document in real-time; live document comment/chat operations that allow multiple individuals to provide real-time feedback on a shared document; and so on. As will be described herein in greater detail, each file access service can be associated with one or more interfaces that are also supported by the third-party application. In this fashion, the third-party application can perform one or more special operations that also supported by a particular file access service.

According to some embodiments, upon receipt of a communication from the file browser indicating a selection of a file of interest, the file provider daemon can assist the third-party application in ultimately receiving a secure Uniform Resource Locator (URL). In particular, the secure URL can enable the third-party application to directly-access the file of interest from a particular file system via a file access service. Upon receipt of access to the file of interest, the third-party application can perform one or more of the aforementioned special operations on the file of interest, with the assistance of the file provider daemon. For example, the file provider daemon, acting on behalf of the third-party application, can generate a list of interfaces based on data received from the file access service responsible for making the file of interest accessible to the third-party application. According to some embodiments, each interface on the list is associated with a respective special operation that can be performed on the file of interest.

Upon generation of the list of interfaces associated with the file access service, the file provider daemon can present the list to the third-party application. Using the list, the third-party application can select one or more interfaces that enable the third-party application to perform one or more special operations on the file of interest. In response to the selection of one or more interfaces by the third-party application, the file provider daemon can also help create a direct channel of communication between the third-party application and the file access service associated with the file of interest, so that the third-party application can perform a special operation on the file of interest. For instance, the file provider daemon can enable the third-party application and the file access service to both identify common protocols associated with each interface selected by the third-party application from the aforementioned list of interfaces. In this fashion, for each interface selected, the third-party application and the file access service can directly communicate with each other, over a specific common protocol, to enable the third-party application to perform a specific special operation on the file of interest.

Accordingly, the file provider daemon can act as a broker between a third-party application and a file access service by assisting them in their search for one or more interfaces that they each have in common with one another. Using a common protocol (agreed upon by the third-party application and the file access service), the third-party application can perform one or more special operations, supported by the file access service, on a file of interest. In this fashion, the third-party application can make full use of any features offered by the third-party application on a file of interest made accessible by the file access service—without compromising the security of potentially sensitive data stored on a file system.

A more detailed description of the various techniques described herein, and the manner in which they can be implemented, is provided below in conjunction with FIGS. 1, 2A-2F, 3A-3F, 4A-4B, 5, and 6.

Figure 6:
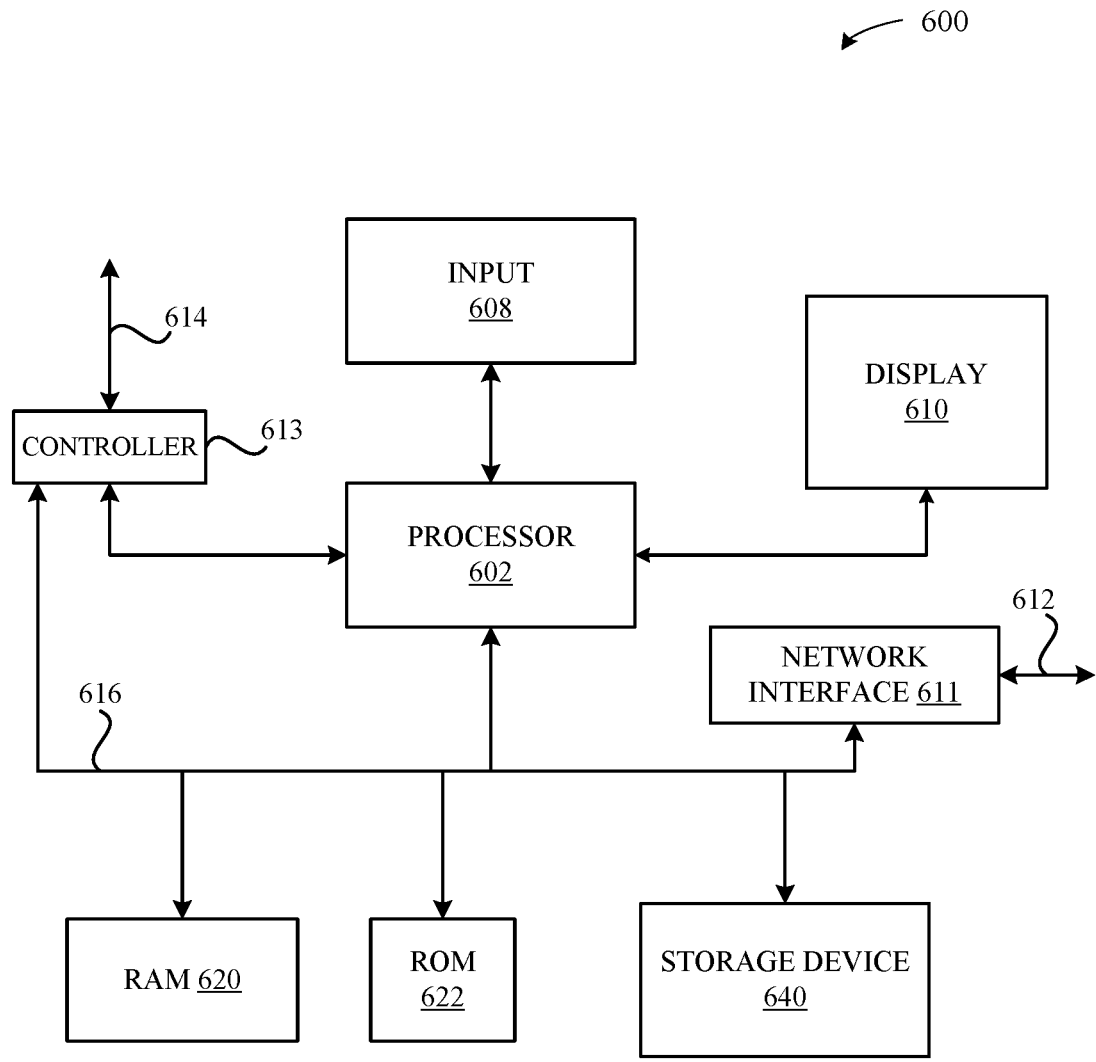
FIG. 6 illustrates a detailed view of a computing device that can be used to implement the various techniques described herein, according to some embodiments.

FIG. 1 illustrates a high-level overview 100 of a computing device 102 that can be configured to perform the various techniques described herein. As shown in FIG. 1, the computing device 102 can include a processor 104, a volatile memory 106 (e.g., a Random-Access Memory (RAM)), and a non-volatile memory 118 (e.g., a storage device). It is noted that a more detailed breakdown of example hardware components that can be included in the computing device 102 is illustrated in FIG. 6, and that these components are omitted from the illustration of FIG. 1 merely for simplification purposes. For example, the computing device 102 can include additional non-volatile memories (e.g., solid state drives, hard drives, etc.), other processors (e.g., a multi-core central processing unit (CPU)), and the like. According to some embodiments, an operating system (OS) 108 can be loaded at the volatile memory 106, where the OS 108 can be enabled to execute a variety of applications that enable the various techniques described herein to be implemented. As described in greater detail herein, such applications can include an application 110, a file view controller 112, a file provider daemon 114, and file access services 116.

According to some embodiments, the file view controller 112 can represent a file browser that operates independently (e.g., is sandboxed) from a third-party application, such as the application 110, that invokes the file browser, and includes the functionality to generate user interfaces. For example, a user interface generated by the file view controller 112 can be actively presented to a user via a display device (not illustrated in FIG. 1) that is communicably coupled to the computing device 102. A user interface generated by the file view controller 112 can also include one or more files presented to the user for selection.

It should be noted that "sandboxed" as applied herein is not meant to be limiting. For instance, a "sandboxed" mode can include, but is not limited to, any general security mechanism that can create a restrictive computing environment for one or more components on the computing device 102. In this fashion, components operating within a "sandboxed" mode on the computing device 102 can perform procedures without risk of harm to the computing device 102. It should also be noted that any reference to an application herein is not meant to be limiting and can include any type of application. For instance, an application can include, but is not limited to, a word processing application, a spreadsheet application, a presentation application, and the like. Additionally, it should be noted that any reference to a file herein is not meant to be limiting and can include any type of file. For instance, a file can be at least any or a combination of documents, spreadsheets, presentations, messages, text, videos, audio files, images, and the like.

Also, as will be described in greater detail herein, the file view controller 112, using an enumeration logic, can perform enumeration procedures to gather information about a folder hierarchy implemented by a file system, such as a local file system, a cloud-based file system, and the like. According to some embodiments, the enumeration procedures performed by the file view controller 112 can include, but are not limited to, gathering data associated with (1) the manner in which folders within a file access service from file access services 116 are identified and/or queried; (2) the manner in which top-level folders and sub-level folders are organized relative to a root folder; (3) the manner in which folders are created and modified (e.g., adding a folder, deleting a folder, renaming a folder, etc.); (4) display folder attributes (e.g., tags, last used date, folder origin information, thumbnails, etc.); (5) the manner in which permissions can be set on folders; and so on.

Additionally, based on the resultant data generated from the enumeration procedures performed by the file view controller 112 or requested to be performed by file view controller 112, the file view controller 112 can assign an identifier for each enumerated file (e.g., name, type, status, etc.). In a similar manner, according to some embodiments, the file view controller 112 can assign an identifier for each enumerated folder. As will be described in greater detail herein, the file view controller 112 can assign identifiers to folders/files in a manner that allows the file provider daemon 114 to identify one or more files that can be made accessible to the application 110, provided the application 110 is authorized to access the file in accordance with the validation procedures described herein.

According to some embodiments, the file provider daemon 114 can engage in communications with a file access service 116 from the file access services 116 to discover one or more interfaces supported by the file access service 116. In this fashion, according to some embodiments, the file provider daemon 114 can generate interface lists based on one or more interfaces discovered by the file provider daemon 114. As will be described in greater detail herein, the interface lists generated by the file provider daemon 114 can be used by the application 110 to determine whether the application 110 supports one or more interfaces that are also supported by the file access service 116. Each interface shared by both the application 110 and the file access service 116 can allow the application 110 to perform a respective special operation on a file of interest made accessible by the file access service 116, which will be described in greater detail herein.

Additionally, as will be described in greater detail herein, the file provider daemon 114 can perform validation procedures to determine if the application 110 is authorized to access a file prior to the performance of interface discovery procedures. The validation procedures performed by the file provider daemon 114 can include querying one or more tables, including tables that store enumeration identifiers generated by the file view controller 112 during the performance of the enumeration procedures described herein. Furthermore, according to some embodiments, the file provider daemon 114 can include the functionality to gather protocol information that enables the application 110 to directly communicate with the file access service 116 to perform one or more special operations on a file of interest made accessible by the file access service 116.

It should be noted that any reference to a daemon herein can, also or in addition, refer to any software, thread, or process. A non-limiting example of a daemon is a process or program that runs as a background process and that can wait for events or times to perform operations.

According to some embodiments, each file access service 116 of file access services 116 can provide access to a different file system, e.g., a local file system, a network file system, a cloud-based file system, and the like. As described in greater detail herein, each file access service 116 can perform enumeration procedures, using enumeration logic, for a set of files within the domain of the file access service 116. Additionally, as will be described in greater detail herein, each file access service 116 can include the functionality to support one or more interfaces that each correspond to a respective special operation.

Special operations performed by each file access service 116 can be performed on one or more files associated with a particular file system. Additionally, as will be described herein, each file access service 116 can send the file provider daemon 114 protocol information that enables the application 110 to directly communicate with the file access service 116. In this fashion the protocol information can be used by both the application 110 and the file access service 116 to perform one or more special operations on a file of interest made accessible by the file access service 116.

Accordingly, FIG. 1 provides a high-level overview of different hardware/software architectures that can be implemented by computing device 102 in order to carry out the various techniques described herein. A more detailed breakdown of these techniques will now be provided below in conjunction with FIGS. 2A-2F, 3A-3F, 4A-4B, 5, and 6. As described in greater detail below, these components can be utilized to assist in the generation of dynamic and customizable user interfaces that can quickly display relevant files to a user.

FIGS. 2A-2E illustrate exemplary user file enumeration procedures that can be performed to enable a software application to perform an operation on a file stored on a file system while enforcing privacy measures, according to some embodiments.

Figure 2A:
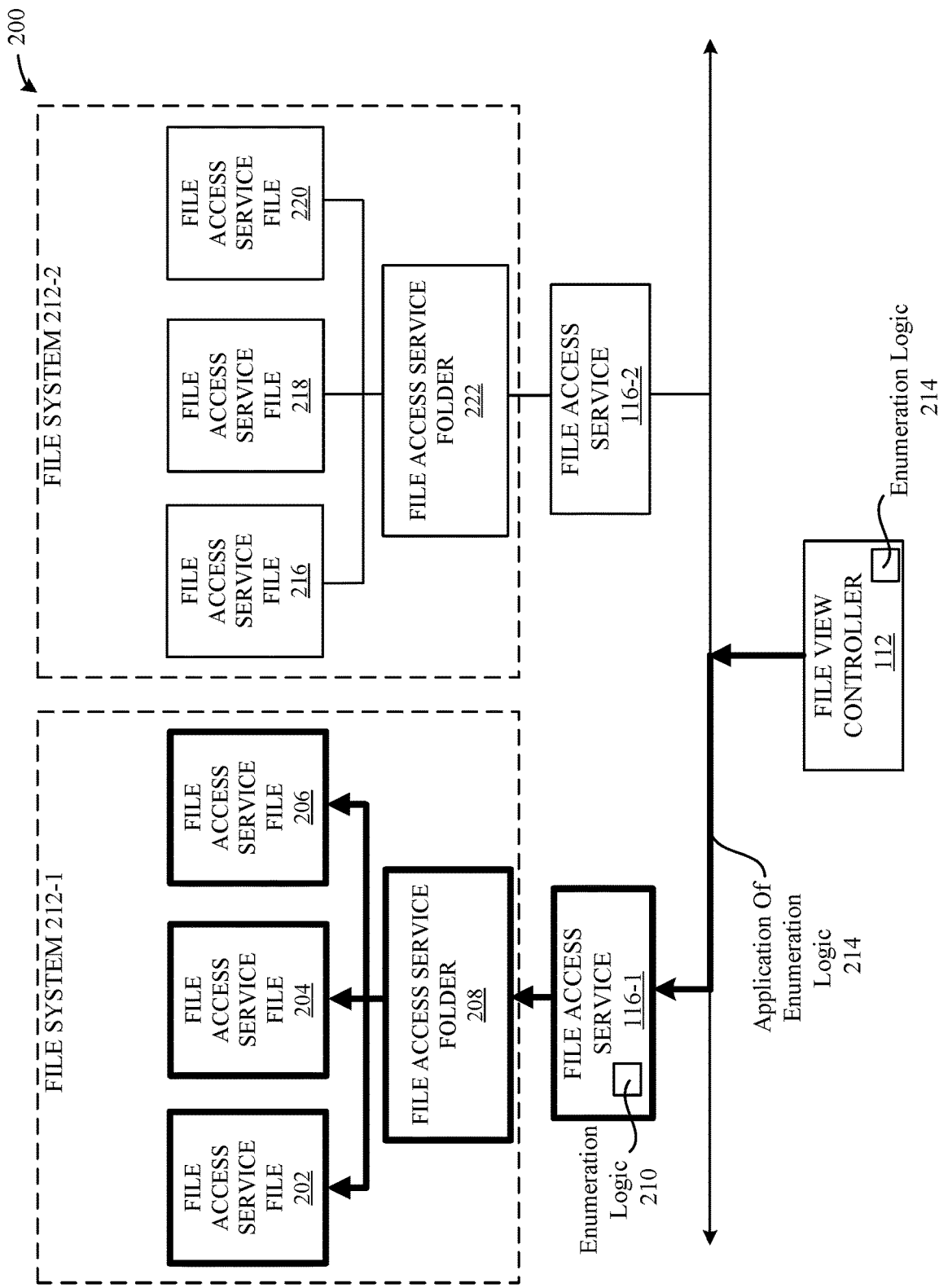

FIG. 2A illustrates an overview 200 of exemplary user file enumeration procedures that can be performed to enable a software application to access files while enforcing privacy measures, according to some embodiments. It is noted that the procedures depicted in herein, according to some embodiments, can be performed by the file view controller 112 operating in a sandboxed mode. In this fashion, the application 110 cannot influence the procedures performed by the file view controller 112, and is generally unaware of the activities performed by/within the file view controller 112.

In accordance with the embodiment depicted in FIG. 2A, file system 212-1 can represent a file system that stores files remotely from the computing device 102. The file system 212-1 can include a file access service folder 208 that includes file access service files 202, 204, and 206. As illustrated in FIG. 2A, file access service 116-1 can access files associated with the file system 212-1. In this fashion, the file access service 116-1 can access the file access service folder 208 including the files stored therein (e.g., file access service files 202, 204, and 206).

The file access service 116-1 can perform enumeration procedures on files under the domain of the file access service 116-1. For example, the file access service 116-1 can include enumeration logic 210, which can be applied to folders/files that are managed by the file access service 116-1, including the file access service folder 208. In this example, the enumeration logic 210 can enable the file access service 116-1 to perform enumeration procedures that allow the file access service 116-1 to gather data associated with folders/files located within the file access service folder 208. In this fashion, the file access service 116-1 can gather data (e.g., tag data, "recently-accessed" date information, file thumbnail images data, etc.) on the file access service files 202, 204, and 206. Accordingly, upon completion of the enumeration procedures, the file access service files 202, 204, and 206 can be a set of newly-enumerated files that are under the domain of the file access service 116-1.

According to some embodiments, the file view controller 112 can perform enumeration procedures that are independent of the enumeration procedures performed by the file access service 116-1. For example, with further reference to FIG. 2A, according to some embodiments, the file view controller 112 can perform enumeration operations on folders/files associated with the file access service 116-1 and the file access service 116-2 (including file access service folder 222 and file access service files 216, 218 and 220). According to some embodiments, using an enumeration logic 214, the file view controller 112 can selectively perform enumeration procedures to gather folder hierarchy information about a particular file system.

For instance, the file view controller 112 can specifically target the folders/files associated with the file system 212-1 by performing enumeration procedures for the file access service 116-1 (as depicted by the bolded arrows directed to the file access service 116-1, including the folders/files made accessible by the file access service 116-1). In this fashion, the file view controller 112 can, through application of the enumeration logic 214, gather folder hierarchy data associated with the file access service 116-1. In this manner, the file view controller 112 can gather similar folder hierarchy information previously gathered by the file access service 116-1.

Accordingly, the file view controller 112 can gather data associated with the file access service files 202, 204, and 206, including the locations in which the file access service files 202, 204, and 206 are stored within the file access service folder 208. Although FIG. 2A only depicts files located within the file access service folder 208, it is noted that the file access service 116-1 can access other folders/files, in addition to the file access service folder 208. During the performance of enumeration procedures, the file view controller 112 can assign an identifier to each file that is detected. In this fashion, the file view controller 112 can store a list of identifiers using a data structure, as will be described in greater detail herein.

FIG. 2B depicts an exemplary data structure that can be used to store data associated with enumeration procedures performed by the file view controller 112, according to some embodiments. As illustrated in FIG. 2B, enumeration table 226 can store various types of information associated with enumeration procedures performed by the file view controller 112 on the file access service 116-1. As illustrated by enumeration results storage procedures 224 in FIG. 2B, the enumeration table 226 can store an enumeration identifier associated with each folder/file detected by the file view controller 112 during the performance of enumeration procedures. For instance, the enumeration table 226 can store data that includes the name of the file access service 116-1. As shown in FIG. 2B, the file access service folder 208 can be a root-level folder associated with the file access service 116-1. Accordingly, the root-level location of the file access service folder 208 can be stored within the enumeration table 226. Additionally, the enumeration table 226 can store enumeration IDs assigned to the file access service files 202, 204 and 206 (e.g., the enumeration IDs 55-57, respectively). In this fashion, the file view controller can perform similar enumeration procedures for additional file access services, such as the file access service 116-2, which will be discussed in greater detail herein.

Figure 2C:
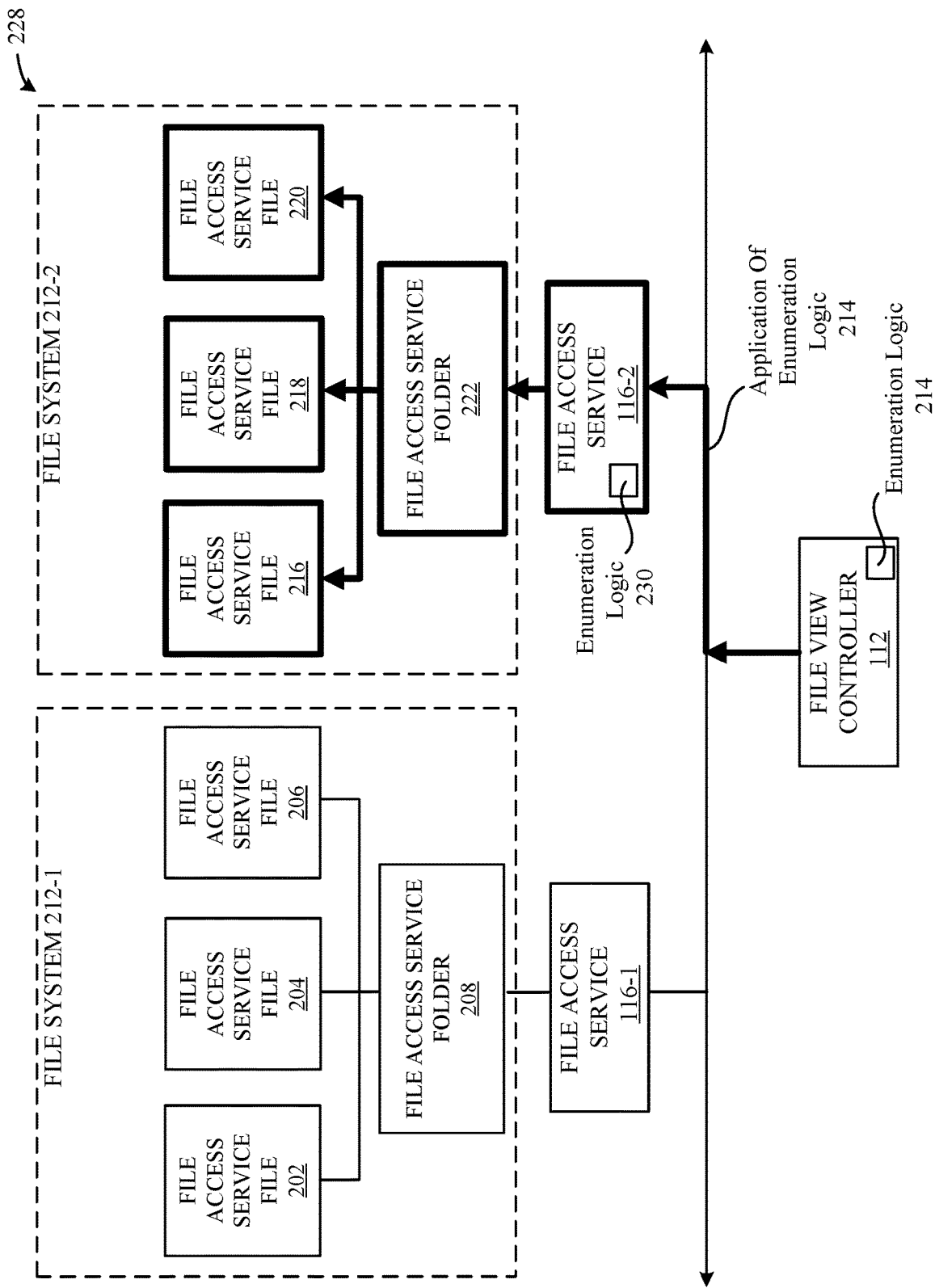

FIG. 2C illustrates an overview of additional user file enumeration procedures, according to some embodiments. Enumeration procedures 228, depicted in FIG. 2C, illustrates exemplary file enumeration procedures that can be performed on folders/files associated with the file system 212-2, according to some embodiments. According to some embodiments, the file system 212-2 can be a local file system stored on a client device. In accordance with the embodiment depicted in FIG. 2C, the file access service 116-2 can provide access to the file system 212-2, which is resident on the computing device 102.

The file access service 116-2 can perform enumeration procedures on folders/files under the domain of the file access service 116-2. As illustrated by the enumeration procedures 228, the file access service 116-2 can include enumeration logic 230 that can be applied to folders/files stored by the file system 212-2, including a file access service folder 222. Enumeration logic 230 can enable the file access service 116-2 to perform enumeration procedures that are similar to enumeration procedures described herein with respect to the file access service 116-1. Accordingly, upon completion of the enumeration procedures, the file access service files 216, 218, and 220 can be a set of newly-enumerated files that are under the domain of the file access service 116-2.

With further reference to FIG. 2C, the file view controller 112 can perform enumeration procedures that are independent of the enumeration procedures performed by the file access service 116-2. Using similar enumeration procedures described with respect to the file access service 116-1, the file view controller 112 can specifically target the performance of enumeration procedures for the file access service 116-2 (as depicted by the bolded arrows directed to the file access service 116-2 including folders/files made accessible by the file access service 116-2). The file view controller 112 can, through application of enumeration logic 214, gather folder hierarchy data associated with the file access service 116-2.

In this fashion, the file view controller 112 can gather similar folder hierarchy information previously gathered by the file access service 116-2. Accordingly, the file view controller 112 can gather data associated with the file access service files 216, 218, and 220, including the locations in which the file access service files 216, 218, and 220 are stored within the file access service folder 222. Although FIG. 2C only depicts files located within the file access service folder 222, it is noted that the file access service 116-2 can access other folders/files, in addition to the file access service folder 222. During the performance of enumeration procedures for the file access service 116-2, the file view controller 112 can assign additional identifiers to each file that is detected.

For example, FIG. 2D depicts additional entries that can be inserted into the enumeration table 226 in response to enumeration procedures performed by the file view controller 112, according to some embodiments. As depicted in enumeration results storage procedures 232, the enumeration table 226 can store data that includes the name of the file access service 116-2. As shown in FIG. 2D, the file access service folder 222 can be a root-level folder associated with the file access service 116-2. Accordingly, the root-level location of the file access service folder 222 can be stored within the enumeration table 226. The enumeration table 226 can also store enumeration IDs assigned to the file access service files 216, 218, and 220 (e.g., enumeration IDs 58-60, respectively). According to some embodiments, the file view controller 112 can use data stored in the enumeration table 226 to perform procedures that can re-organize folders/files, detected during the performance of enumeration procedures described herein, in accordance with a desirable folder hierarchy. In this fashion, the file view controller 112 can generate a user interface that can display folders/files in accordance with the desirable folder hierarchy.

Figure 2E:
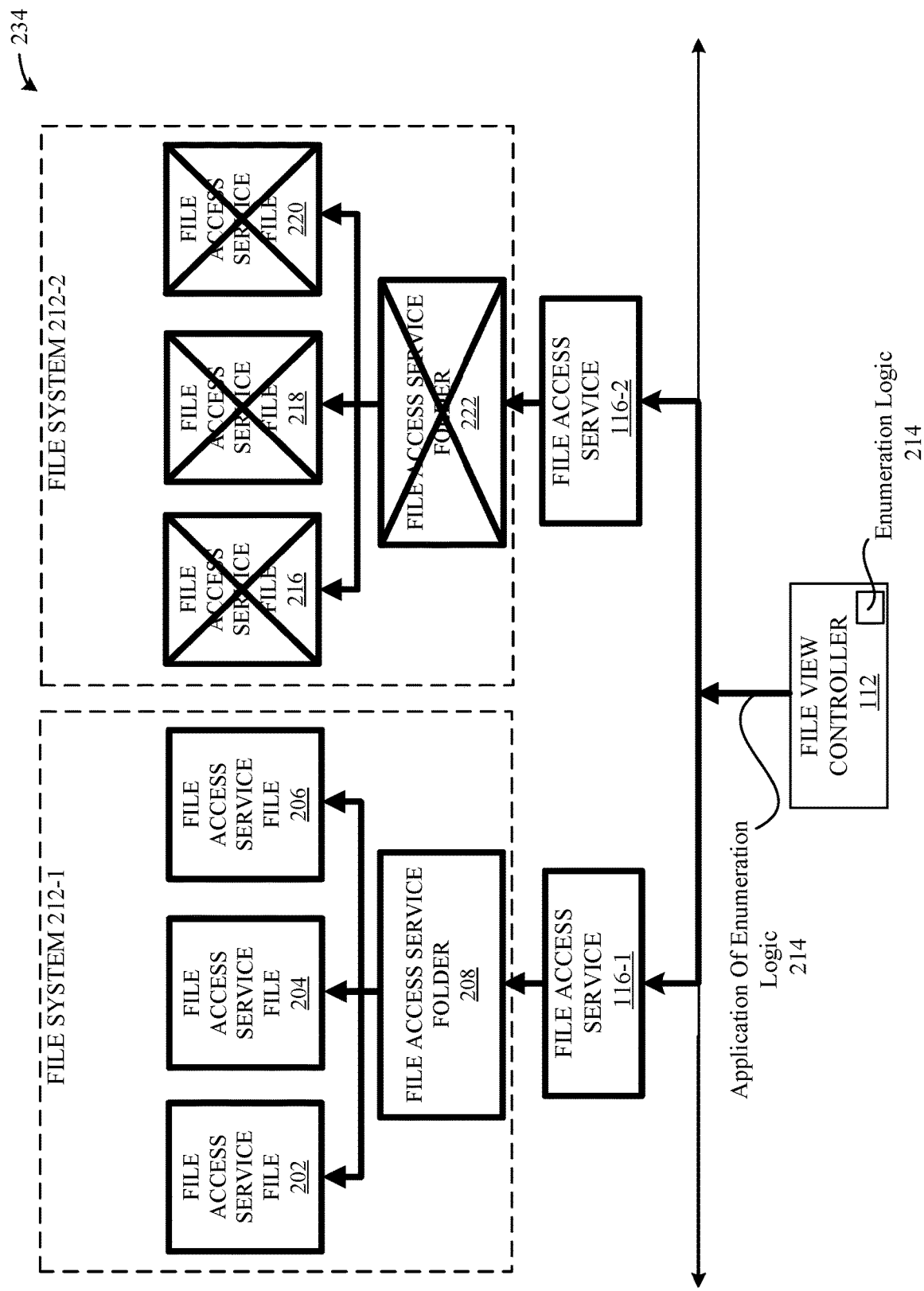

For example, FIG. 2E depicts how the file view controller 112, using the enumeration logic 214, can identify one or more files that can be displayed within a user interface generated by the file view controller 112, according to some embodiments. According to some embodiments, the enumeration logic 214 enables the file view controller 112 to perform actions on folders/files, assigned to specific enumeration IDs during enumeration procedures, in accordance with a pre-determined folder hierarchy. In this fashion, the enumeration logic 214 can enable the file view controller 112 to perform actions on files enumerated by the file view controller 112 for the file access services 116-1 and 116-2. Actions performed by the file view controller 112, using the enumeration logic 214, can include, but are not limited to, the manner in which folders are identified and/or queried; how top-level folders and sub-level folders are organized relative to a root directory; how folders are created and modified (e.g., adding a folder, deleting a folder, renaming a folder, etc.); how to display folder attributes (e.g., tags, last used date, file origins, thumbnails, etc.); how permissions can be set on folders; and so on.

For instance, as depicted by enumeration procedures 234 in FIG. 2E, the file view controller 112 can apply the enumeration logic 214 to the folders/files associated with the file access services 116-1 and 116-2. In one example, based on pre-determined folder hierarchy details incorporated into the enumeration logic 214, file view controller 112 can enable the file access service folder 208 and/or the file access service files 202, 204, and 206 to be displayed, within a user interface generated by the file view controller 112, for user selection whenever a user launches the application 110. In this manner, the file view controller 112 can also prevent certain folders/files from being displayed within the same user interface when the application 110 is launched. For example, in accordance with the embodiment depicted in FIG. 2E, the enumeration logic 214 can enable the file view controller 112 to prevent file access service folder 222, along with the file access service files 216, 218, and 220 from being displayed on the same user interface used to display file access service files 202, 204 and 206 (folders/files not available for display are marked with an "X").

Figure 2F:
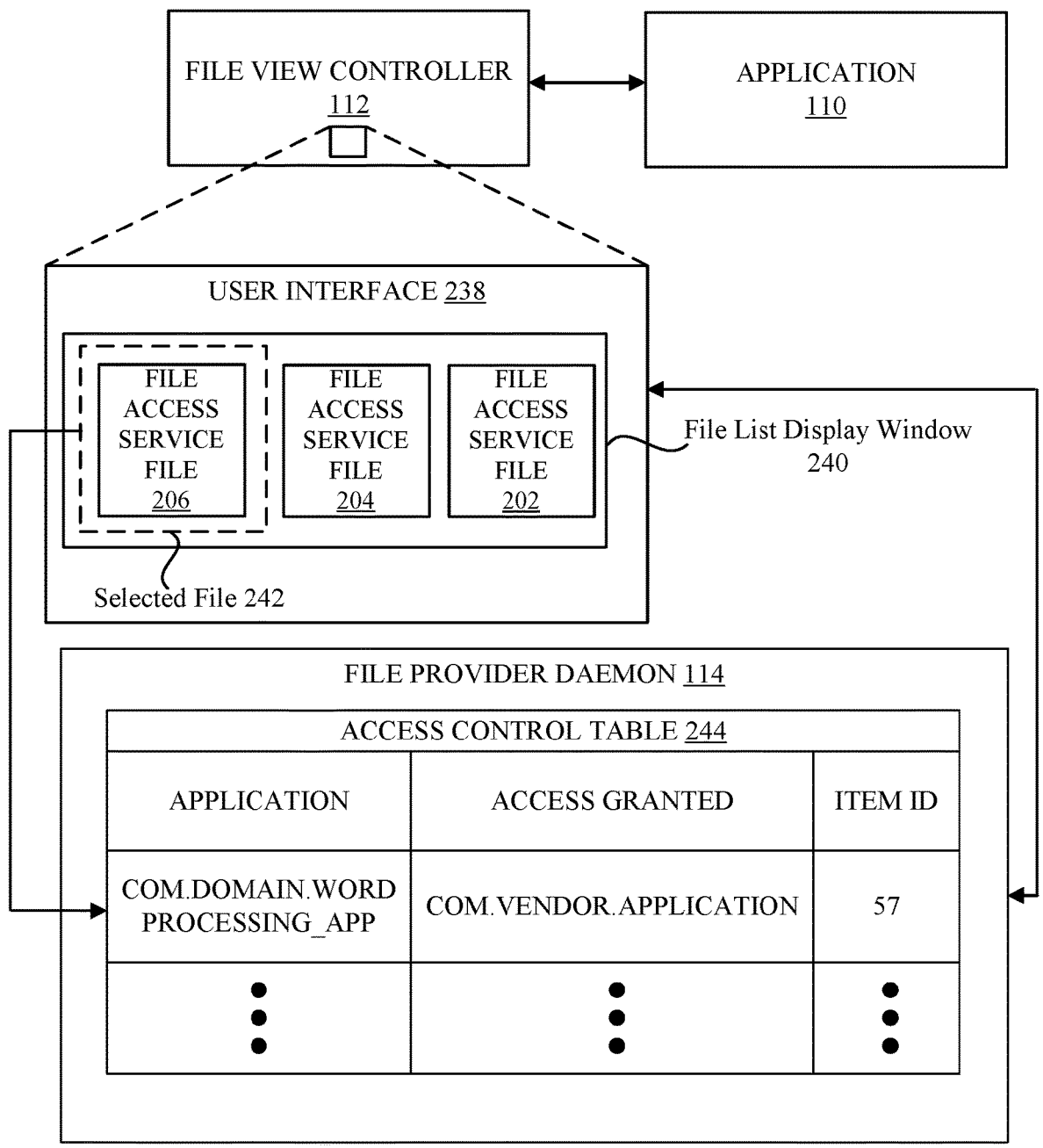
FIG. 2F illustrates exemplary user file selection communication procedures that can be performed to enable a software application to perform an operation on a file stored on a file system while enforcing privacy measures, according to some embodiments.

FIG. 2F illustrates exemplary user file selection communication procedures 236 that can be performed to enable a software application to perform an operation on a file stored on a file system while enforcing privacy measures, according to some embodiments. In particular, FIG. 2F illustrates how files, presented by a user interface generated by the file view controller 112, can be selected and provided to the application 110 while enforcing privacy measures, according to some embodiments. For instance, as illustrated in the file selection procedures depicted in FIG. 2F, the file view controller 112 can independently generate a user interface 238 to display the file access service files 202, 204, and 206 as a list of files that are available for user selection for the application 110. According to some embodiments, the pre-determined folder hierarchy details incorporated into the enumeration logic 214 (not depicted in FIG. 2F) can determine the manner in which the file access service files 202, 204, and 206 are displayed to the user, via the user interface 238. For example, the enumeration logic 214 can specify the manner in which the file access service files 202, 204, and 206 are arranged for display to the user; the manner in which any thumbnails associated with the file access service files 202, 204, and 206 are displayed; the manner in which the actual file names of the file access service files 202, 204, and 206 are displayed; and so on.

As illustrated in FIG. 2F, a file list display window 240 can be a display region within the user interface 238 that displays the file access service files 202, 204, and 206 for user selection. According to some embodiments, the file view controller 112 can detect when a user selects a file (e.g., selected file 242) from the list of files displayed within the file list display window 240. In response to the detection of the selected file 242, the file view controller 112 can communicate with the file provider daemon 114 to perform further procedures. For example, according to some embodiments, the communications between the file view controller 112 and the file provider daemon 114 can include permission data (e.g., entitlement data) that can notify the file provider daemon 114 that the file view controller 112 has the appropriate permissions to receive information associated with the selected file 242. In response, the file provider daemon 114 can generate a corresponding entry within a table (e.g., access control table 244) that allows the file provider daemon 114 to keep track of the different files the application 110 is permitted to access.

Consider, for example, a scenario in which the application 110 is a word processing application, and the file access service files 202, 204, and 206 are word processing documents that can be opened/accessed by the word processing application. In this scenario, the file access service file 206 can be a desired document that a user seeks to load into the word processing application for editing. Accordingly, the file provider daemon 114 can generate an entry within the access control table 244 that corresponds to the user selecting the file access service file 206 in association with the application 110. For example, as depicted in the access control table 244, the entry generated by the file provider daemon 114 can include data that identifies a domain name of the application 110 (e.g., "com.domain.wordprocessing_app"). Additionally, the entry generated by the file provider daemon 114 can also include information associated with the file access service 116-1 that is associated with the file access service file 206, "com.vendor.application." Furthermore, the entry generated by the file provider daemon 114 can also include information associated with the item identifier stored in the enumeration table 226 (not depicted in FIG. 2F) that corresponds to the file access service file 206 (e.g., item ID value of "57"). Upon storing the entry within the access control table 244, the file provider daemon 114 can establish credentials that the application 110 can utilize to ultimately access the file access service file 206. In particular, using the entry stored within the access control table 244, the file provider daemon 114 can generate a token (for receipt by the application 110) that enables the application 110 to access only the file access service file 206, which is described below in greater detail.

Figure 3A:
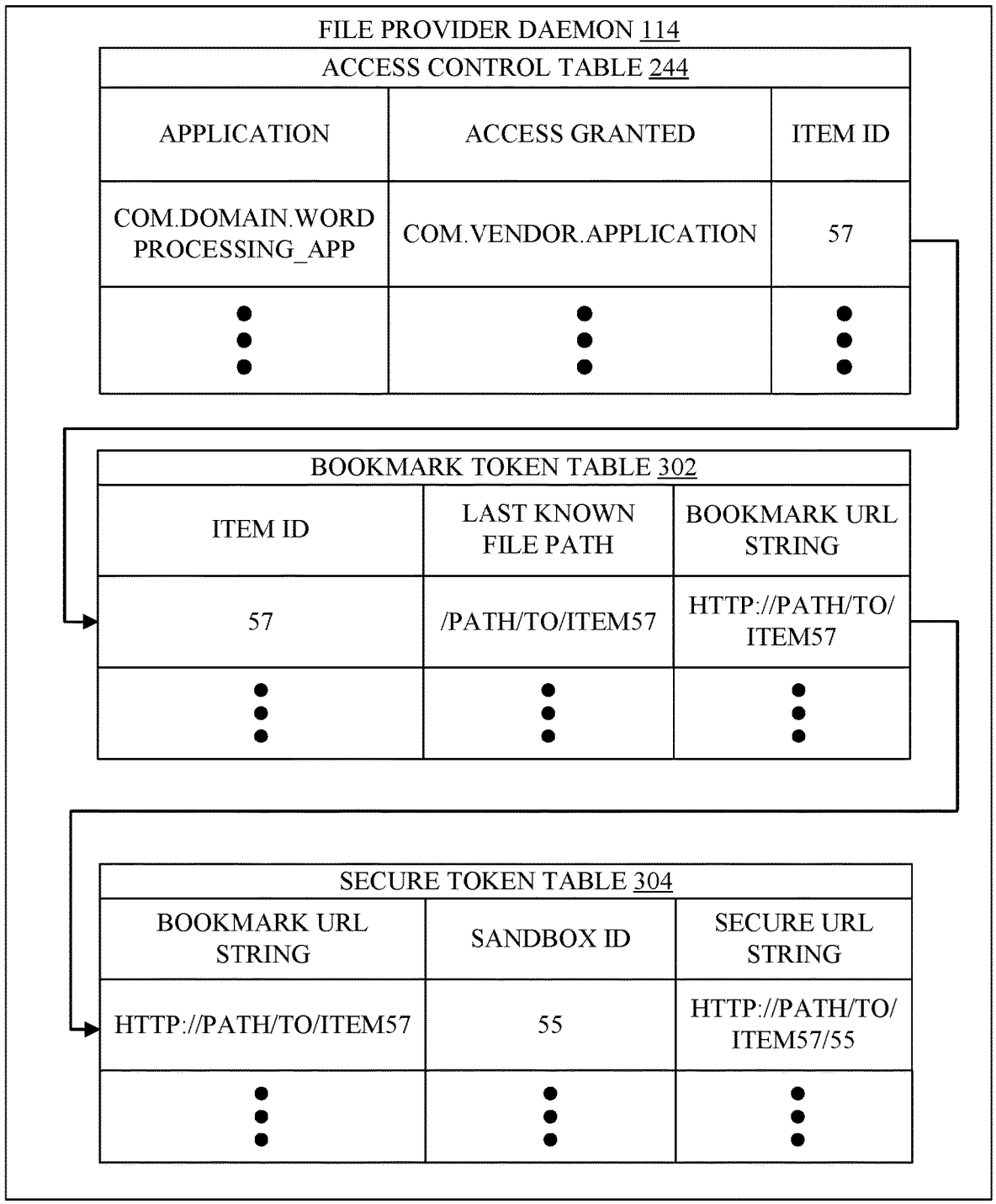
FIGS. 3A-3C illustrate additional exemplary user file selection communication procedures that can be performed to enable a software application to perform an operation on a file stored on a file system while enforcing privacy measures, according to some embodiments.
Figure 3B:
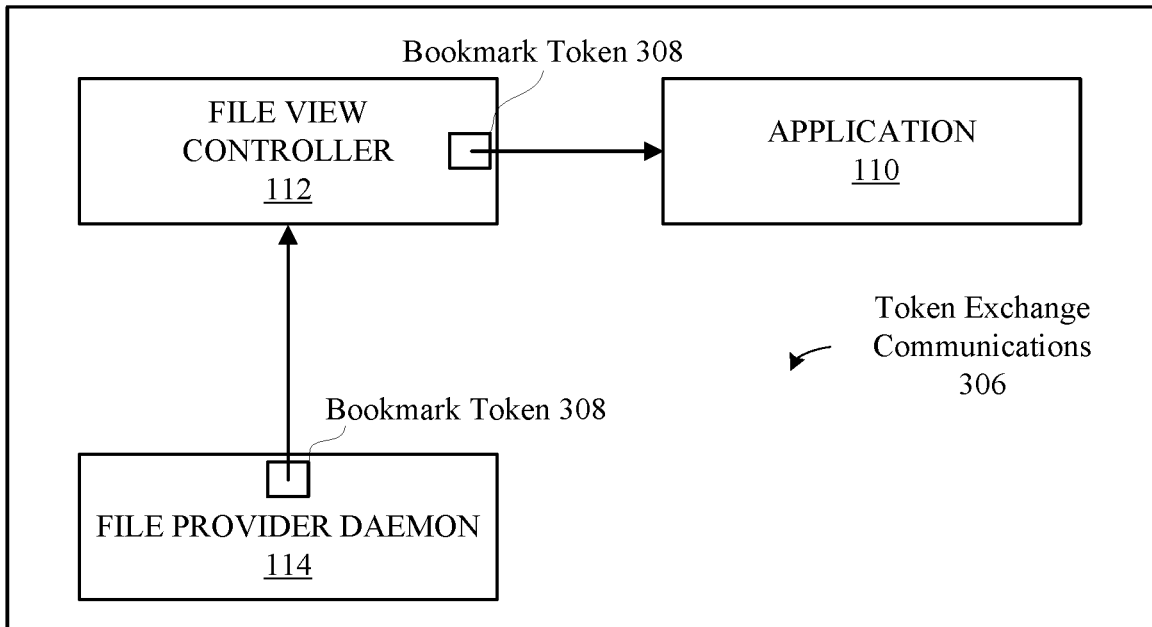
Figure 3B:
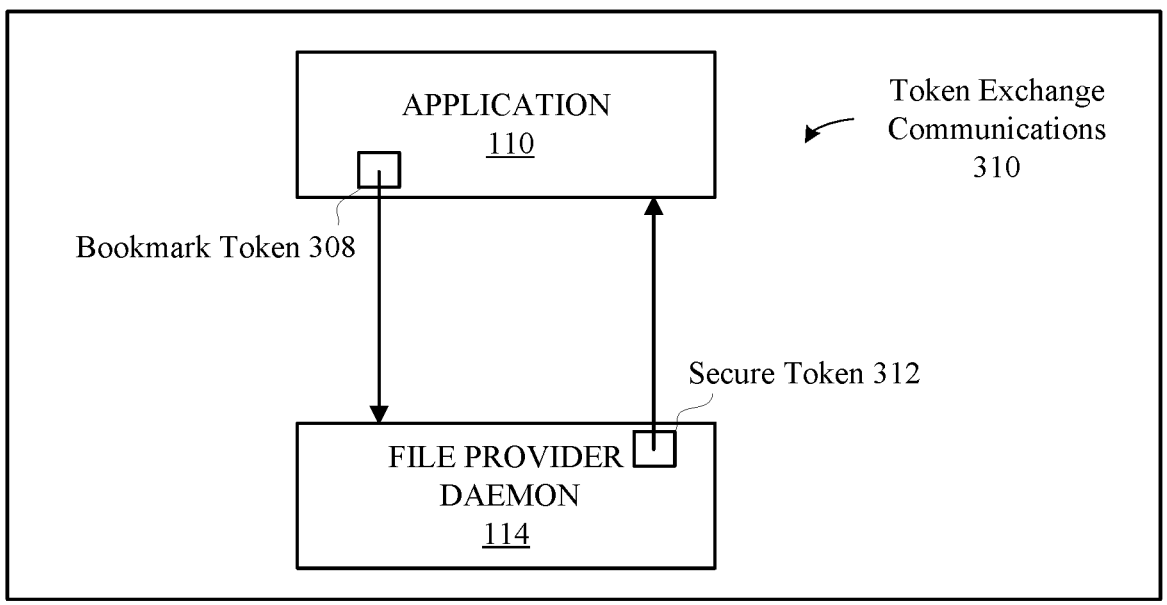
Figure 3C:
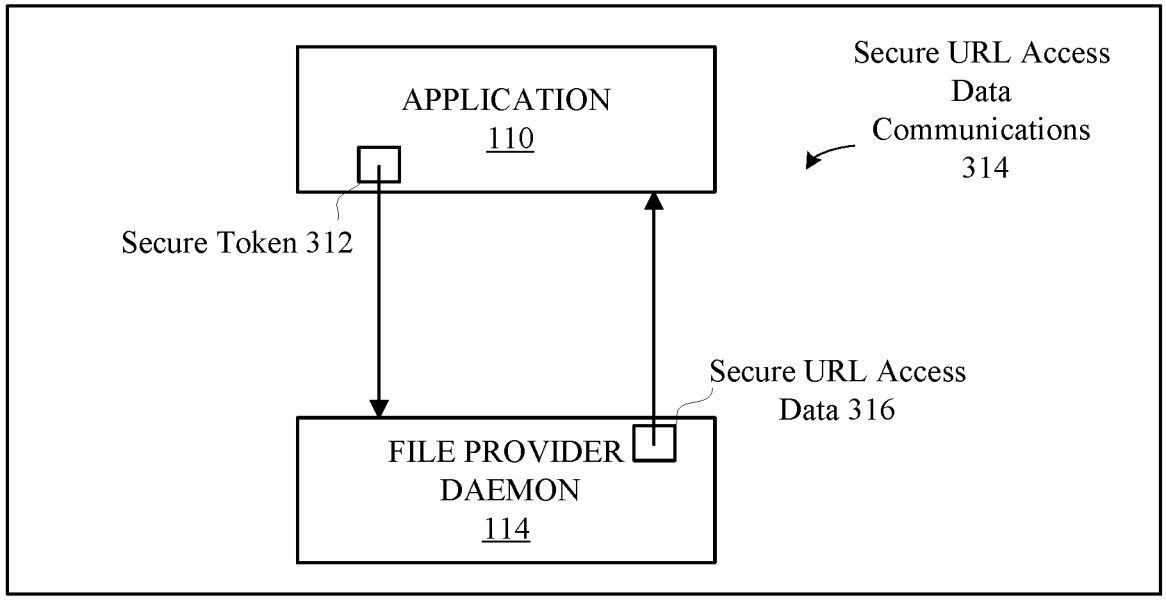
Figure 3C:
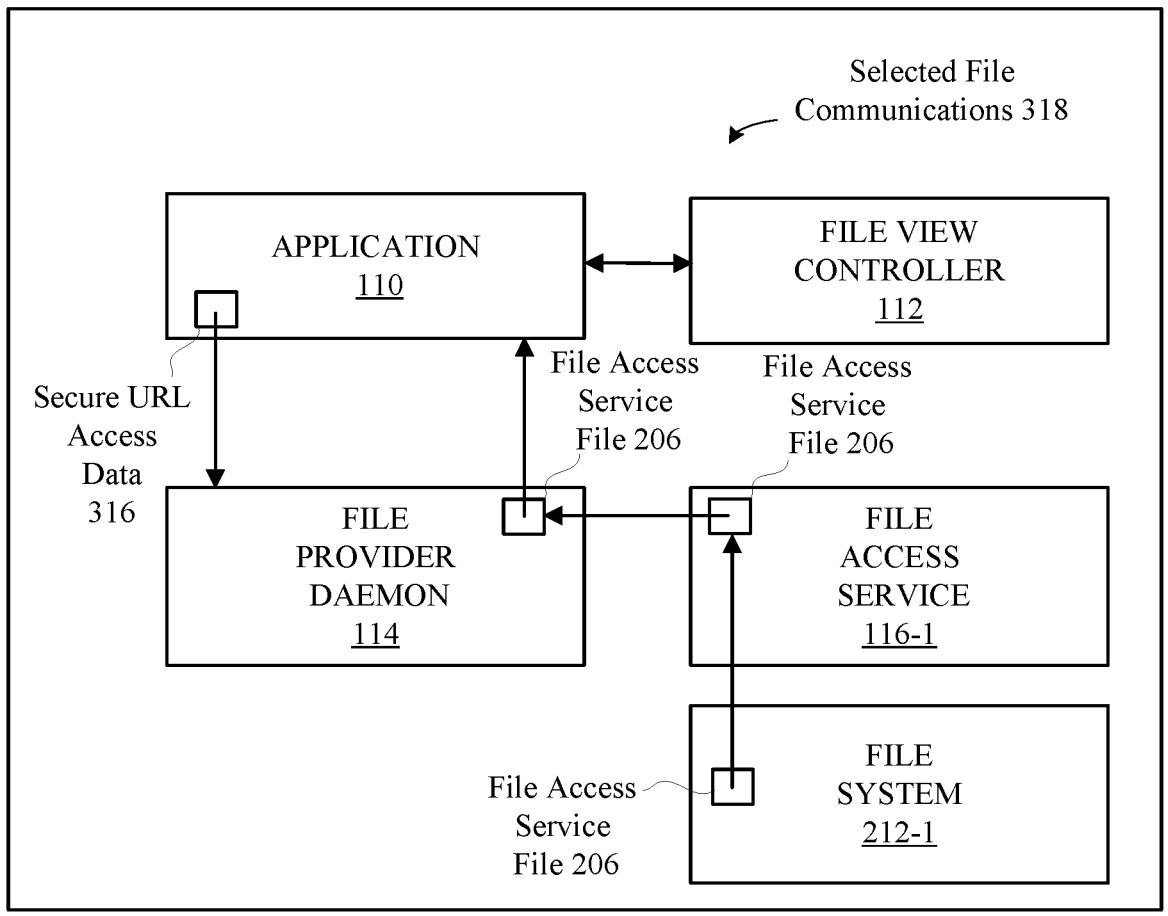

FIGS. 3A-3C illustrate additional exemplary user file selection communication procedures that can be performed to enable a software application to perform an operation on a file stored on a file system while enforcing privacy measures, according to some embodiments. In particular, FIG. 3A illustrates an overview 300 of how tokens can be generated by the file provider daemon 114 to enable the application 110 to access a selected file, according to some embodiments. As shown in FIG. 3A, the file provider daemon 114 can communicate, to bookmark token table 302, data related to entries stored within the access control table 244. In this manner, the file provider daemon 114 can create a new entry within the bookmark token table 302 that can be used to create a bookmark token. For example, the entry created by the file provider daemon 114 and stored in the bookmark token table 302 can include data associated with the item identifier used to identify the file access service file 206 (e.g., item ID value of "57") within the access control table 244. Additionally, the entry within the bookmark token table 302 can also include data associated with the last known file path used to access the file access service file 206 (e.g., "/PATH/TO/ITEM57"). As depicted in FIG. 3A, using the data stored within the bookmark token table 302 (e.g., item ID and a last known file path associated with the selected file), the file provider daemon 114 can generate a URL string (e.g., "http://PATH/TO/ITEM57") that can be delivered as a bookmark token for receipt by the file view controller 112 and processing by the application 110.

According to some embodiments, the file provider daemon 114—like the file view controller 112—can also operate in a sandboxed mode such that the ability of components operating outside of environment of the file provider daemon 114 to access data stored by the file provider daemon 114 is significantly limited and/or prevented. Accordingly, in order to access data from the file provider daemon 114, components operating outside the environment of the file provider daemon 114—e.g., the application 110—can be required to first provide secure bookmark tokens generated by the file provider daemon 114. To establish a secure bookmark token, the file provider daemon 114 can create a new entry within secure token table 304. In particular, the file provider daemon 114 can communicate, to the secure token table 304, data associated with entries stored within the bookmark token table 302.

For example, the entry stored in the secure token table 304 can include data associated with the URL string used to generate a previous bookmark token (e.g., "http://PATH/TO/ITEM57"). Additionally, the entry can also include data associated with a secure identifier (e.g., "sandbox ID") that is required by the file provider daemon 114, for a component operating outside of the environment of the file provider daemon 114, to access data stored by the file provider daemon 114. As depicted in FIG. 3A, the file provider daemon 114 can generate a sandbox ID ("55") that corresponds to a URL string (e.g., "http://PATH/TO/ITEM57") previously generated for a bookmark token. By using secure identifiers (e.g., sandbox IDs) in this fashion, the file provider daemon 114 can provide protection against URL strings that can potentially be derived by malicious entities. Furthermore, as depicted in FIG. 3A, using the data stored within the secure token table 304 (e.g., bookmark string URL and sandbox ID), the file provider daemon 114 can generate a secure URL string (e.g., "http://PATH/TO/ITEM57/55") that can be configured as a secure token for receipt and processing by the application 110. As described in greater detail herein, the application 110 can utilize the tokens generated by the file provider daemon 114 to ultimately gain access to the file access service file 206.

For example, with reference to token exchange communications 306 in FIG. 3B, bookmark token 308 can be generated by the file provider daemon 114 and communicated to the file view controller 112. According to some embodiments, the bookmark token 308 can be converted into a resolvable URL that reveals a last known secure URL link produced by the file provider daemon 114 to enable access to the file access service file 206. In this fashion, the resolvable URL string includes updated data that can be used to reliably access the file access service file 206, regardless of whether the location of the file access service file 206 has been moved. Accordingly, the file view controller 112 can pass the bookmark token 308 to the application 110, which can then perform procedures that convert the bookmark token 308 into the resolvable URL string.

With reference to token exchange communications 310 in FIG. 3B, the application 110 can communicate the bookmark token 308 to the file provider daemon 114. Upon receipt of the bookmark token 308, the file provider daemon 114 can perform validation procedures on the bookmark token 308. For example, with reference to FIG. 3A, the file provider daemon 114 can refer to the access control table 244 to determine if the application 110 is a recognized application within the access control table 244. Upon detecting a correspondence between the application 110 and an entry (e.g., "com.domain.wordprocessing_app") stored in the access control table 244, the file provider daemon 114 can determine that the application 110 is, in fact, a recognized application.

Additionally, the file provider daemon 114 can also reference the bookmark token table 302 to determine if a URL string included in the bookmark token 308 is valid URL string recognized by the file provider daemon 114. For example, the file provider daemon 114 can analyze the URL string included in the bookmark token 308 by comparing the URL string to entries stored in the bookmark token table 302. With reference to FIG. 3A, upon detecting a correspondence between the URL string included in the bookmark token 308 and an entry stored in the bookmark token table 302 (e.g., "HTTP://PATH/TO/ITEM57"), the file provider daemon 114 can determine that the URL string included in the bookmark token 308 is, in fact, valid. In response, as depicted in the token exchange communications 310 in FIG. 3B, the file provider daemon 114 can generate and communicate secure token 312 to the application 110.

With reference to secure URL access data communications 314 in FIG. 3C, the application 110 can communicate, back to the file provider daemon 114, the secure token 312 to enable the application 110 to access the file access service file 206 via a secure URL string included in the secure token 312. Upon receipt of the secure token 312, the file provider daemon 114 can perform validation procedures on the secure token 312 to determine if the application 110 possesses the proper credentials to access the file access service file 206. For example, file provider daemon 114 can validate the secure token 312 by determining whether the secure token 312 includes a valid secure identifier by comparing identifiers included in the secure token 312 to recognizable secure identifiers stored in the secure token table 304. With reference to FIG. 3A, upon detecting a correspondence between the sandbox ID included in the secure token 312 and an entry stored in the secure token table 304 (e.g., "sandbox ID 55"), the file provider daemon 114 can determine that the application 110 does, in fact, have the proper credentials to access the file access service file 206. Accordingly, as depicted in secure URL access data communications 314 in FIG. 3C, the file provider daemon 114 can communicate, to the application 110, secure URL access data 316 that can be used to receive access to the file access service file 206 that is stored on the file system 212-1 and made accessible via the file access service 116-1. In this fashion, the application 110 can open/launch the file access service file 206. According to some embodiments, the application 110 can also perform special operations that involve the file access service file 206, which will be discussed in greater detail herein.

Figure 3D:
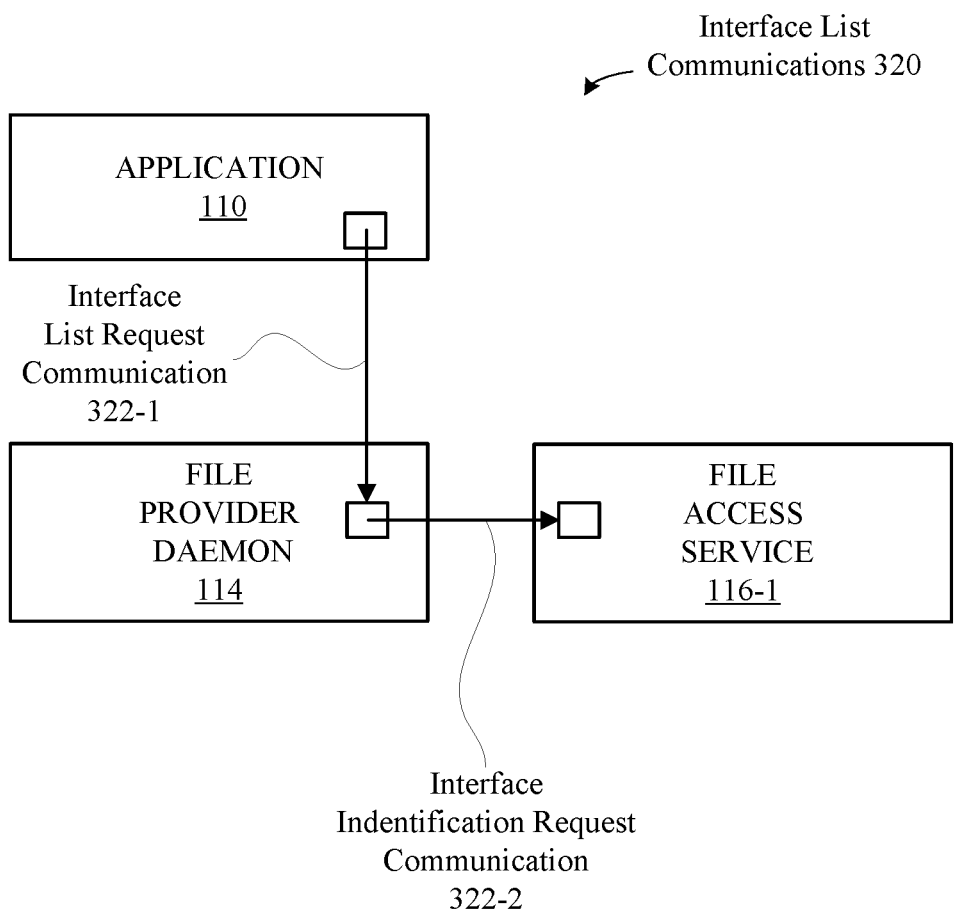
FIGS. 3D-3F illustrate exemplary procedures that enable direct communications between a software application and a file access service to perform an operation on a file stored on a file system while enforcing privacy measures, according to some embodiments.
Figure 3E:
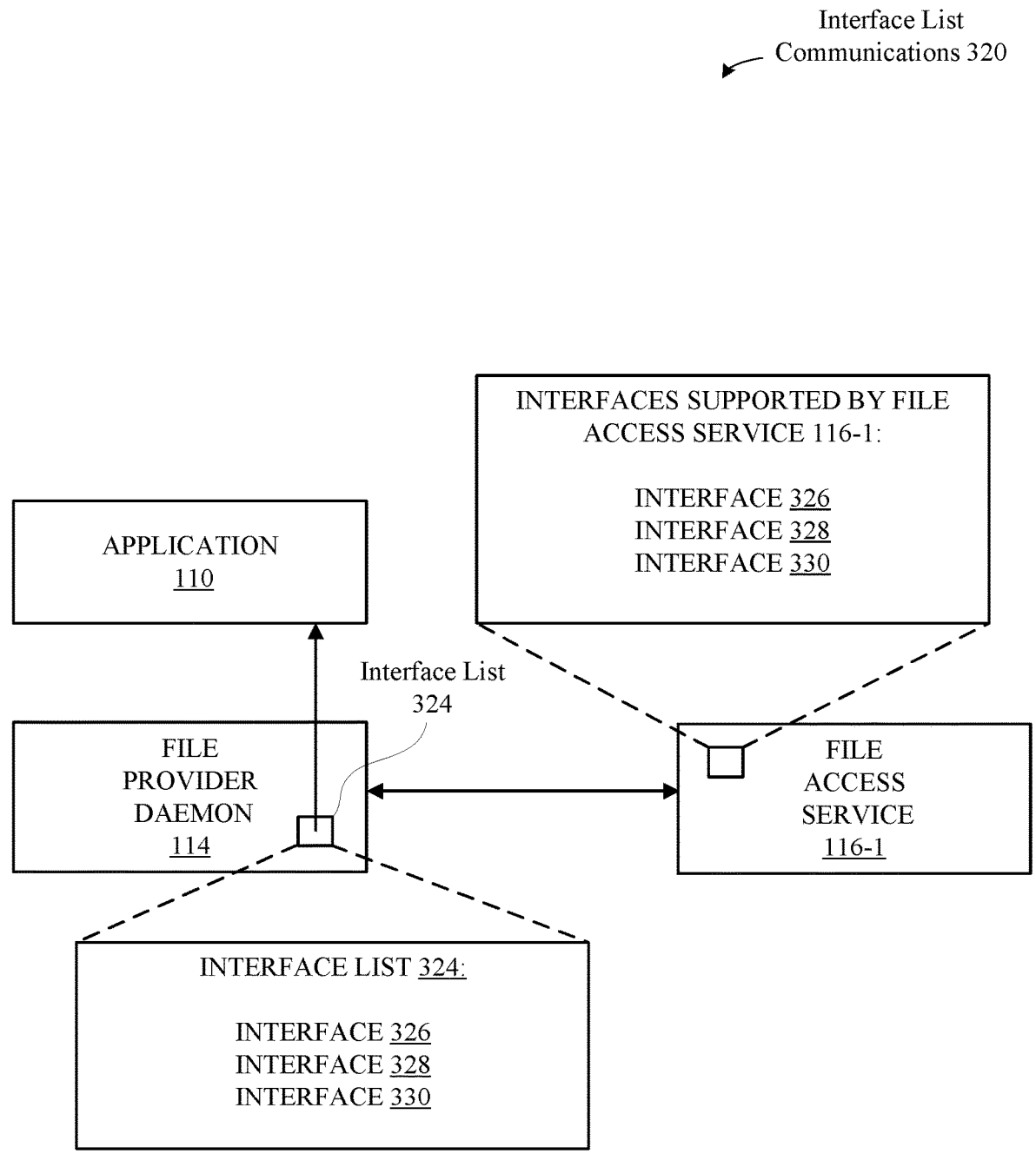
Figure 3F:
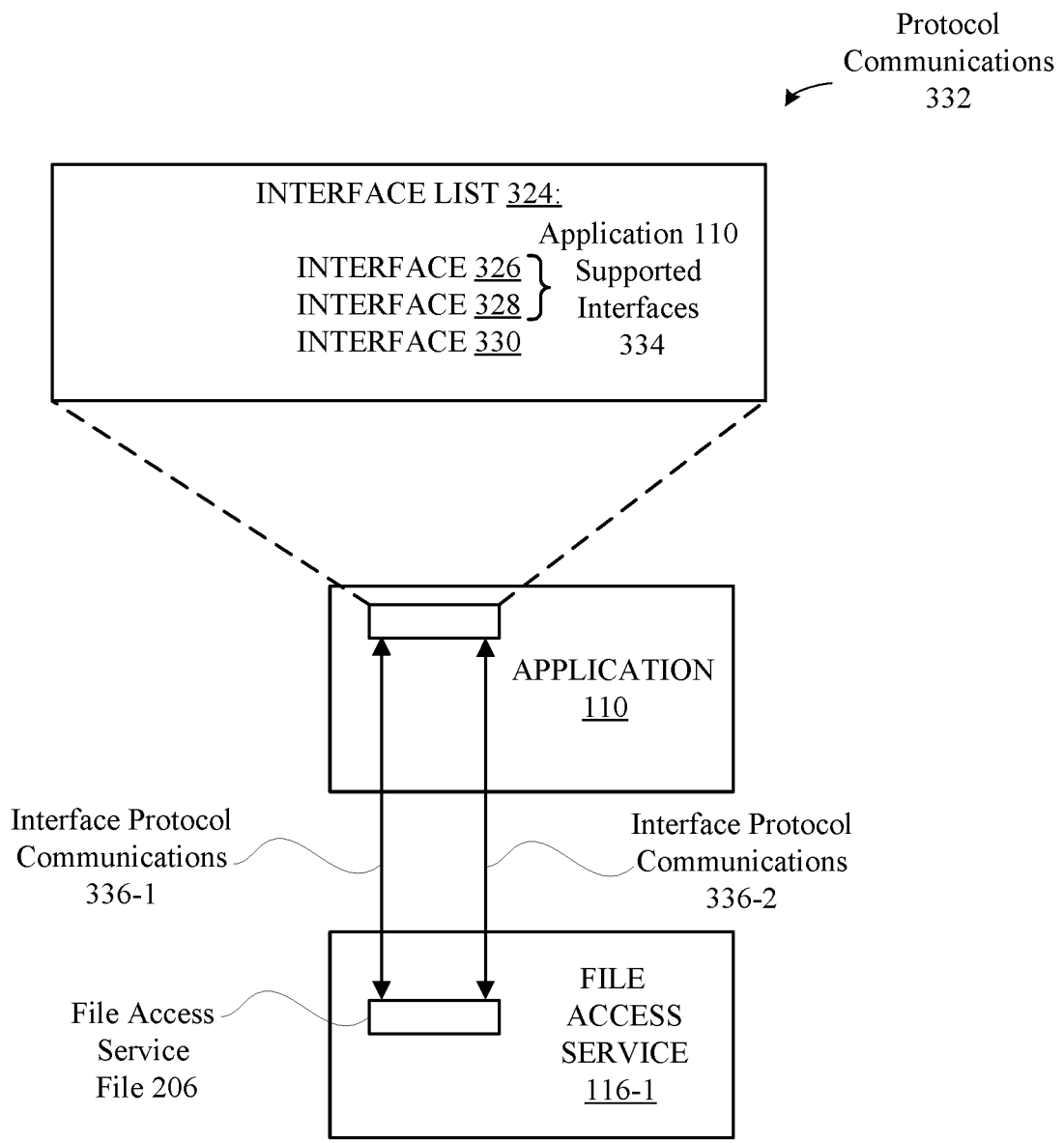

FIGS. 3D-3F illustrate exemplary procedures that enable direct communications between a software application and a file access service to perform an operation on a file stored on a file system while enforcing privacy measures, according to some embodiments. In particular, FIGS. 3D-3F depict exemplary procedures that allow an application (e.g., the application 110) and a file access service (e.g., the file access service 116-1) to directly communicate with each other to perform special operations on a file of interest (e.g., the file access service file 206), according to some embodiments. With reference to the interface list communications 320 depicted in FIG. 3D, the application 110, upon receipt of access to the file access service file 206, can send interface list request communication 322-1 to the file provider daemon 114. The interface list request communication 322-1 can include a request for the file provider daemon 114 to initiate a request, on behalf of the application 110, for the file access service 116-1 to identify one or more interfaces supported by the file access service 116-1. As described herein, each interface can be associated with a respective special operation that can be performed on files associated with the file access service 116-1. Special operations can include, but are not limited to, video file playback operations, document collaboration operations that allow multiple individuals to edit a shared document in real-time; live document comment/chat operations that allow multiple individuals to provide real-time feedback on a shared document; and so on.

According to some embodiments, upon receipt of the interface list request communication 322-1, the file provider daemon 114 can perform validation procedures to determine if the application 110 is authorized to access the file access service file 206. For example, the file provider daemon 114 can query the secure token table 304 to determine whether the application 110 is authorized to access the file access service 206. For instance, with reference to FIG. 3A, the file provider daemon 114 can identify the association between the sandbox ID (e.g., sandbox ID "55") and the item ID (e.g., item ID "57") assigned to the file access service file 206. Upon detecting a correspondence between the sandbox ID and the item ID, the file provider daemon 114 can determine that the application 110 is, in fact, authorized to access the file access service file 206. Accordingly, with further reference to the interface list communications 320 depicted in FIG. 3D, the file provider daemon 114 can send interface identification request communication 322-2, on behalf of the application 110, to the file access service 116-1.

With continued reference to the interface list communications 320, now depicted in FIG. 3E, the bi-directional communications between the file provider daemon 114 and the file access service 116-1 illustrate how the file provider daemon 114 can identify one or more interfaces supported by the file access service 116-1 that can each be used to perform a respective special operation for the file access service file 206. In accordance with the embodiment depicted in FIG. 3E, interfaces 326, 328, and 330 can each be interfaces supported by the file access service 116-1. The interfaces 326, 328, and 330 can be separate interfaces that are each configured to enable the file access service 116-1 to perform a respective special operation on a file stored on the file system 212-1, including the file access service file 206.

For example, in accordance with the embodiment depicted in FIG. 3E, the file access service file 206 (not depicted in FIG. 3E) can be a shared document that allows multiple individuals to have permission to read/edit the contents of the file access service file 206. Accordingly, the interface 326 can be associated with a document collaboration operation that allows multiple individuals to edit the file access service file 206 in real-time. Additionally, the interface 328 can be associated with a live document comment/chat operation that allows multiple individuals to provide real-time feedback on the file access service file 206. According to some embodiments, the interface 330 can be associated with a video file playback operation that allows a user to view/stream a video file (not depicted in FIG. 3E) that is both stored on the file system 212-1 and made accessible via the file access service 116-1.

With further reference to the interface list communications 320 depicted in FIG. 3E, the file provider daemon 114 can generate interface list 324 that includes each interface supported by the file access service 116-1, including the interfaces 326, 328, and 330. Accordingly, the file provider daemon 114 can communicate the generated interface list 324 to the application 110 for further processing. For example, as will be discussed in greater detail herein, the application 110 can, with the assistance of the file provider daemon 114, gather protocol information that enables the application 110 to directly communicate with the file access service 116-1 to perform one or more special operations on the file access service file 206.

It should be noted that, according to some embodiments, the file provider daemon 114 can be configured to detect special operations added/modified by the file access service 116-1 over time. For instance, the file provider daemon 114 can be configured to detect interface version updates that include improved functionality/added features to a particular interface. In this fashion, according to some embodiments, the file provider daemon 114 can generate a new interface identification request communication that enables the file provider daemon 114 to discover one or more newly added/modified special operations supported by the file access service 116-1 that can be used on the file access service file 206. Additionally, according to some embodiments, notifications associated with interface version updates can be configured to appear on user interfaces generated by the file view controller 112 (not depicted in FIG. 3E). In this manner, a user can be alerted to the fact that the file access service 116-1 includes a recently added/modified special operation that can be used on the file access service file 206.

With reference to protocol communications 332 depicted in FIG. 3F, the application 110, upon receipt of the interface list 324 from the file provider daemon 114 (not depicted in FIG. 3F), can perform procedures that identify one or more interfaces listed in the interface list 324 that are supported by the application 110. In this fashion, the identification procedures performed by the application 110 can scan the interface list 324 to determine whether interfaces 326, 328, and/or 330 are interfaces that are supported by the application 110. As depicted by the application 110 supported interfaces 334 in FIG. 3F, the application 110, upon completion of the identification procedures, can determine that, of the interfaces listed in the interface list 324, the application 110 supports both interfaces 326 and 328. In this manner, both the application 110 and the file access service 116-1 include the functionality (e.g., a similar software/hardware environment) to perform procedures enabled by both interfaces 326 and 328. Accordingly, the file provider daemon 114 can perform additional procedures that enable the application 110 and the file access service 116-1 to communicate with each other using a direct communications channel.

For example, FIG. 3F illustrates how the file provider daemon 114 can generate one or more direct communication channels, between the application 110 and the file access service 116-1, to send messages associated with a particular interface and also communicate resultant modifications made to the file access service file 206, according to some embodiments. In accordance with protocol communications 332 depicted in FIG. 3F, the file provider daemon 114 can enable the application 110 to communicate messages associated with the interfaces 326 and 328 to the file access service 116-1 using different communication protocols.

For example, according to some embodiments, upon determining that the interfaces 326 and 328 are supported by the application 110, the application 110 can request the file provider daemon 114 to gather, from the file access service 116-1, protocol communication parameter information for both the interface 326 and for the interface 328. According to some embodiments, the protocol communication parameter information can include, but is not limited to, file header information, software development kit ("SDK") information, protocol definitions, and so on. According to some embodiment, the protocol communication parameter information can also specify specific protocols that can be used such as the Web Application Open Platform Interface ("WOPI") protocol, Representational State Transfer ("REST") Protocol, dictionary-based protocols, and so on. In this fashion, the protocol communication parameter information can include parameters that enable the application 110 and the file access service 116-1 to engage in direct communications. Upon receipt of the requested protocol communication parameter information from the file access service 116-1, the file provider daemon 114 can send the protocol communication parameter information to the application 110.

It should be noted that, according to some embodiments, the protocol communication parameter information can be included in interfaces lists generated by the file provider daemon 114 (e.g., interface list 324). In this fashion, the file provider daemon 114 can gather protocol communication parameter information for each interface discovered by the file provider daemon 114 during the performance of interface list generation procedures described herein.

In accordance with the embodiment depicted in FIG. 3F, interface protocol communications 336-1 are enabled based on protocol parameter settings that are specifically configured for communications associated with the interface 326. In this fashion, as depicted by the protocol communications 332 in FIG. 3F, the file access service 116-1 and the application 110 can exchange messages associated with the interface 326 via the interface protocol communications 336-1. The exchanged messages associated with the interface 326 enable the application 110 to perform document collaboration operations that allow a user, using the application 110, to edit the file access service file 206 in real-time. According to some embodiments, modifications made to the file access service file 206, via the interface 326, can be communicated to the file system 212-1 (not depicted in FIG. 3F) using a file transfer protocol ("FTP") communication channel established between the application 110 and the file access service 116-1. In this fashion, the FTP communication channel established between the application 110 and the file access service 116-1 can be configured specifically for modifications made to the file access service file 206 via the interface 326.

Additionally, in accordance with the embodiment depicted in FIG. 3F, interface protocol communications 336-2 are enabled based on protocol parameter settings that are specifically configured for communications associated with the interface 328. In this fashion, as depicted by the protocol communications 332 in FIG. 3F, the file access service 116-1 and the application 110 can exchange messages associated with the interface 328 via the interface protocol communications 336-2. The exchanged messages associated with the interface 328 enable the application 110 to perform live document comment/chat operations that allows a user using application 110 to provide real-time feedback on the file access service file 206. According to some embodiments, modifications made to the file access service file 206, via the interface 328, can be communicated to the file system 212-1 using a FTP communication channel established between the application 110 and the file access service 116-1. According to some embodiments, the FTP communication channel can be separate from the FTP communication channel configured for the interface 326, described herein. In this fashion, the application 110 and the file access service 116-1 can create an FTP communication channel that is configured specifically for modifications made to the file access service file 206 via the interface 328.

It should be noted that, according to some embodiments, the procedures described in FIGS. 3D-3F are performed on a per-file basis. For example, the file provider daemon 114 performs the interface list communications procedures and/or protocol information communications described herein for each file selected by a user (e.g., file selected via the user interface 238 depicted in FIG. 2F), provided the file selected by the user is validated in accordance with the file access validation procedures described herein. For instance, with reference to the user interface 238 depicted in FIG. 2F, the same procedures described in FIGS. 3D-3D can be applied to any of the file access service files 204 and 202, should the user select either of the files.

Additionally, it should be noted that, according to some embodiments, the procedures described in FIGS. 3D-3F can be performed on files stored on a local file system, such as the file system 212-2. In this fashion, according to some embodiments, the procedures described in FIGS. 3D-3F can performed using a file access service that can make local file system files accessible to the application 110, such as the file access service 116-2. Accordingly, using the procedures described in FIGS. 3D-3F, the application 110 can make full use of any features offered by the application 110 for a specific file of interest that is made accessible by a file access service (file access services 116-1 and 116-2)—without compromising the security of potentially sensitive data stored on file system (e.g., file systems 212-1 and 212-2).

Figure 4A:
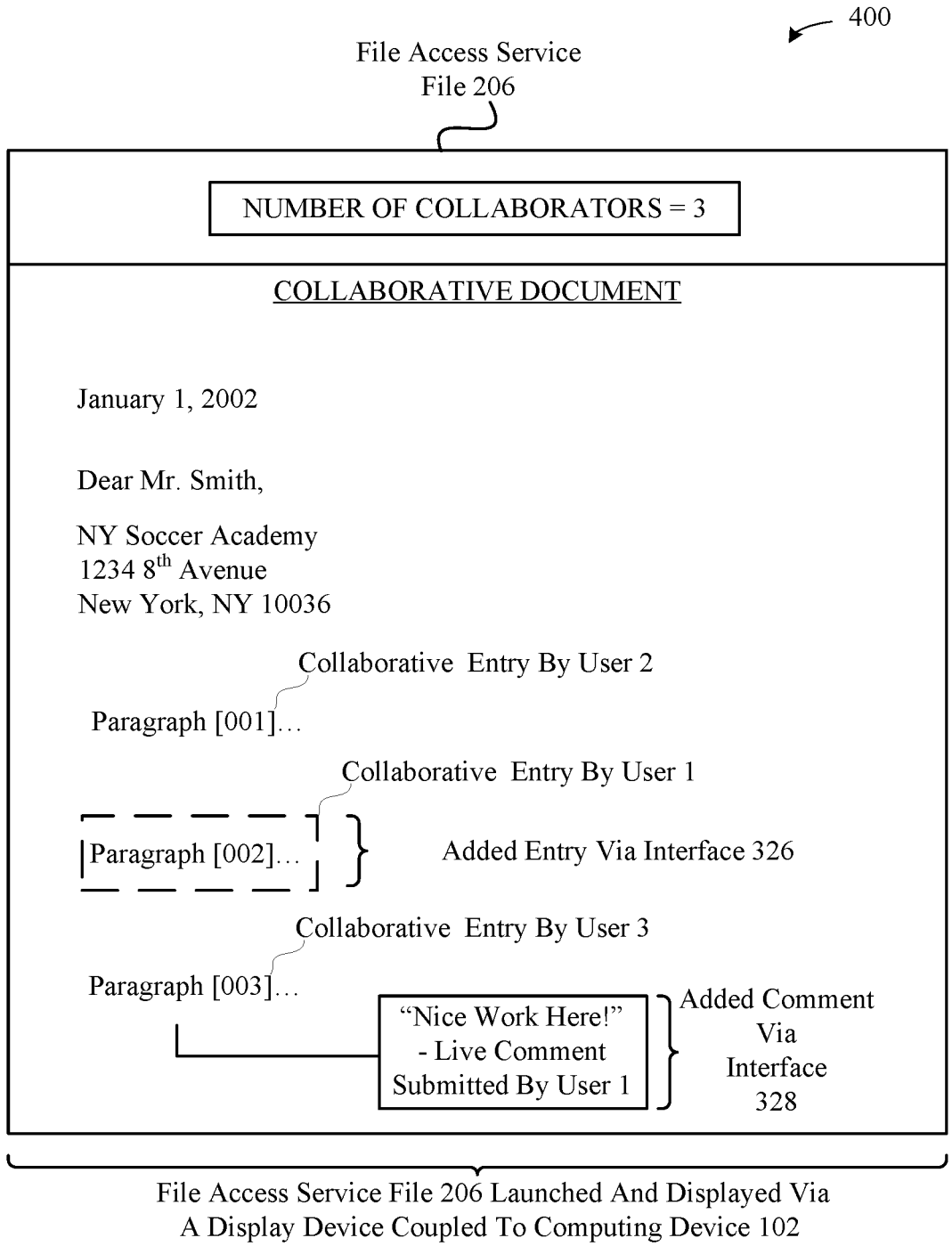
FIGS. 4A-4B illustrate exemplary special operations performed on a file stored on a file system while enforcing privacy measures, according to some embodiments.
Figure 4B:
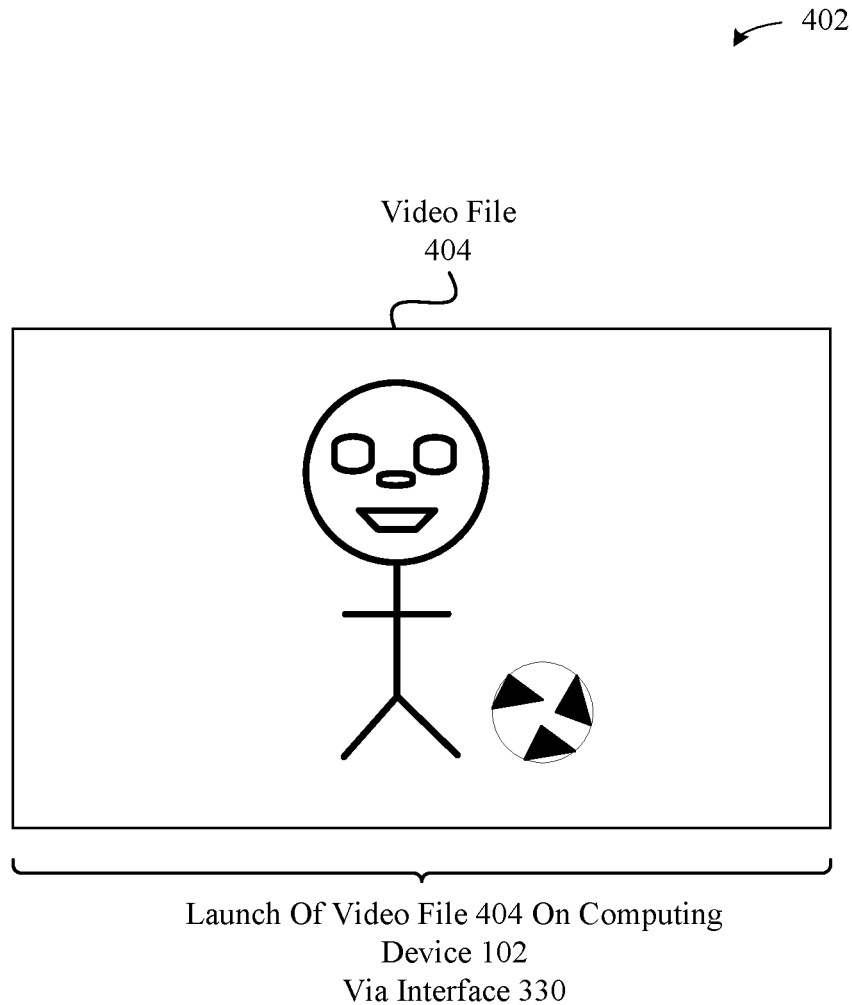

FIGS. 4A-4B illustrate exemplary special operations performed on a file stored on a file system while enforcing privacy measures, according to some embodiments. In particular, FIG. 4A illustrates exemplary special operations 400 performed on the file access service file 206 via interfaces identified by the application 110, with the assistance of the file provider daemon 114, according to some embodiments. As described herein, according to some embodiments, the application 110 can be a word processing application and the file access service file 206 can be a shared document that is can be accessed/edited by multiple users (e.g., "user 1", "user 2", and "user 3" depicted in FIG. 4A). Additionally, as described herein, the interface 326 can be associated with a document collaboration operation that allows "user 1," "user 2," and "user 3" to contribute their respective efforts on the file access service file 206 in real-time.

For example, "user 1" can be a user using the application 110, which can be launched by "user 1" on the computing device 102. "User 1" can also be a user who is permitted to access/edit the file access service file 206. Using the procedures described herein (e.g., procedures described in FIGS. 3D-3F), the application 110 can be enabled, via the interface 326, to allow "user 1" to modify the file access service file 206. As depicted in FIG. 4A, the application 110 and the file access service 116-1 can exchange messages, associated with the interface 326, to allow the real-time additions/edits, made by "user 1," to paragraph [002] of the file access service file 206. Accordingly, using the procedures described herein (e.g., procedures described in FIGS. 3D-3F), the modified version of the file access service file 206 (i.e., the version the file access service file 206 that includes the additions/edits made by "user 1" to paragraph [002]) can be stored by the file system 212-1 and made accessible to the application 110 during a subsequent launch of the file access service file 206.

Additionally, as depicted in FIG. 4A, using the procedures described herein (e.g., procedures described in FIGS. 3D-3F), the application 110 can be enabled, via the interface 328, to allow "user 1" to make real-time comments on the file access service file 206/chat with other users permitted to access the file access service file 206 (e.g., "user 2" and "user 3). In his fashion, the application 110 and the file access service 116-1 can exchange messages, associated with the interface 328, to allow the "nice work here!" comment submitted by "user 1" to be included in the file access service file 206. Accordingly, using the procedures described herein (e.g., procedures described in FIGS. 3D-3F), the modified version of the file access service file 206 (i.e., the version the file access service file 206 that includes the additions/edits to file access service file 206 described above and the comment submitted by "user 1") can be stored by the file system 212-1 and made accessible to the application 110 during a subsequent launch of the file access service file 206.

FIG. 4B illustrates an additional exemplary special operation 402 performed on a video file via interfaces identified by the application 110, with the assistance of the file provider daemon 114, according to some embodiments. FIG. 4B illustrates how a video file stored in a file system (e.g., file system 212-1) and made accessible to an application (e.g., application 110) by a file access service (e.g., file access service 116-1) can be accessed and displayed to a user, according to some embodiments. According to some embodiments, the application 110 can be an application that is capable of launching/streaming the video file 404 via the file access service 116-1. In this fashion, the file provider daemon 114 (not depicted in FIG. 4B) can perform the validation procedures described herein to determine if the application 110 is authorized to access the video file 404.

Provided the file provider daemon 114 determines that the application 110 is, in fact, authorized to access the video file 404, the file provider daemon 114 can perform the interface list communications and the protocol communications procedures described herein to enable the application 110 and the file access service 116-1 to directly communicate messages associated with an interface that enables a video file playback operation for the video file 404. For example, as described herein, the file access service 116-1 can support the interface 330, in addition to the interfaces 326 and 328. In this fashion, the interface 330 can be associated with a video file playback operation that allows a user to view video file 404 by launching the application 110 on the computing device 102 and selecting the video file 404 via the file view controller 112 (not depicted in FIG. 4B). As illustrated in FIG. 4B, using the procedures described herein (e.g., procedures described in FIGS. 3D-3F), the application 110 can be enabled, via the interface 330, to allow the user to view the video file 404 on the computing device 102 via the file access service 116-1. For instance, the application 110 and the file access service 116-1 can exchange messages, associated with the interface 330, that enable the video file 404 to be launched and displayed to the user via a display device (not depicted in FIG. 4B) coupled to the computing device 102.

Figure 5:
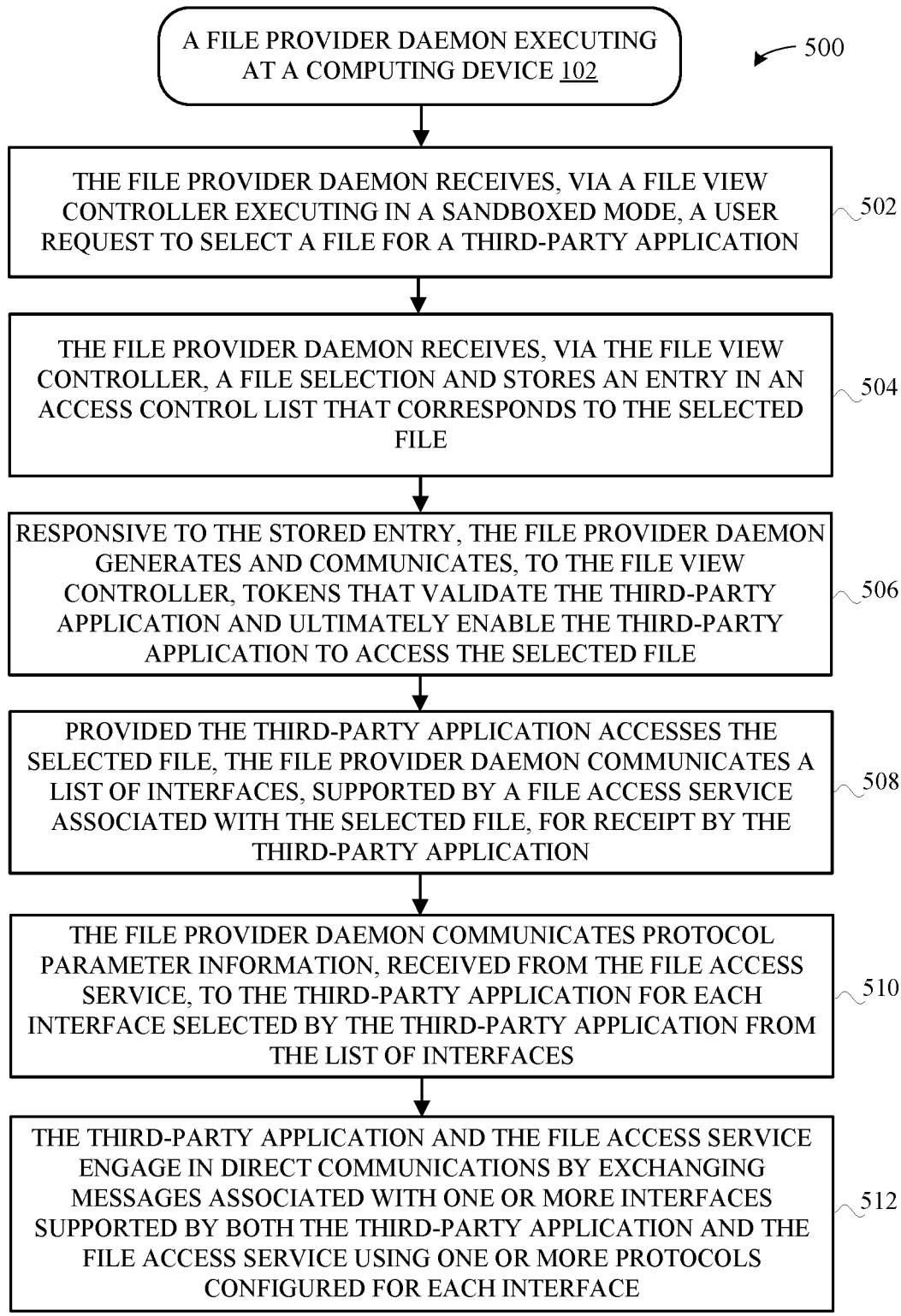
FIG. 5 illustrates a method for enabling a software application to perform an operation on a file stored on a file system while enforcing privacy measures, according to some embodiments.

FIG. 5 illustrates a method 500 for enabling a software application to perform an operation on a file stored on a file system while enforcing privacy measures, according to some embodiments. As shown in FIG. 5, the method 500 can be implemented by a file provider daemon executing at the computing device 102, and begins at step 502, where file provider daemon receives, via a file view controller executing in a sandboxed mode, a user request to select a file for a third-party application. Next, at step 504, the file provider daemon receives, via the file view controller, a file selection and stores an entry in an access control list that corresponds to the selected file. Next, at step 506, responsive to the stored entry, the file provider daemon generates and communicates, to the file view controller, tokens that validate the third-party application and ultimately enable the third-party application to access the selected file.

Next, at step 508, provided the third-party application accesses the selected file, the file provider daemon communicates a list of interfaces, supported by a file access service associated with the selected file, for receipt by the third-party application. Next, at step 510, the file provider daemon communicates protocol parameter information, received from the file access service, to the third-party application for each interface selected by the third-party application from the list of interfaces. Finally, at step 512, the third-party application and the file access service engage in direct communications by exchanging messages associated with one or more interfaces supported by both the third-party application and the file access service using one or more protocols configured for each interface.

FIG. 6 illustrates a detailed view of a computing device 600 that can be used to implement the various components described herein, according to some embodiments. In particular, the detailed view illustrates various components that can be included in the computing device 102 illustrated in FIG. 1. As shown in FIG. 6, the computing device 600 can include a processor 602 that represents a microprocessor or controller for controlling the overall operation of the computing device 600. The computing device 600 can also include a user input device 608 that allows a user of the computing device 600 to interact with the computing device 600. For example, the user input device 608 can take a variety of forms, such as a button, keypad, dial, touch screen, audio input interface, visual/image capture input interface, input in the form of sensor data, and so on. Still further, the computing device 600 can include a display 610 that can be controlled by the processor 602 to display information to the user. A data bus 616 can facilitate data transfer between at least a storage device 640, the processor 602, and a controller 613. The controller 613 can be used to interface with and control different equipment through an equipment control bus 614. The computing device 600 can also include a network/bus interface 611 that couples to a data link 612. In the case of a wireless connection, the network/bus interface 611 can include a wireless transceiver.

As noted above, the computing device 600 also include the storage device 640, which can comprise a single disk or a collection of disks (e.g., hard drives), and includes a storage management module that manages one or more partitions within the storage device 640. In some embodiments, storage device 640 can include flash memory, semiconductor (solid state) memory or the like. The computing device 600 can also include a Random-Access Memory (RAM) 620 and a Read-Only Memory (ROM) 622. The ROM 622 can store programs, utilities or processes to be executed in a non-volatile manner. The RAM 620 can provide volatile data storage, and stores instructions related to the operation of applications executing on the computing device 102, including the application 110, the file view controller 112, the file provider daemon 114, and the file access services 116.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for enabling a software application to perform an operation on a file stored on a file system while enforcing privacy measures, the method comprising, at a computing device on which the software application executes:
   receiving, from a file browser, a selection of at least one file of one or more files made accessible by at least one file access service of one or more file access services, wherein the at least one file access service is associated with the file system storing the at least one file, and the file browser executes in a mode such that the software application cannot identify any content displayed within the file browser; and
   in response to determining that the software application is authorized to access the at least one file:
      identifying a first list of operations, to be performed on the at least one file, that the at least one file access service supports,
      communicating the first list of operations for receipt by the software application, wherein the software application performs an identification procedure to select, from the first list, a second list of operations to be performed on the at least one file stored at the file system, wherein the second list includes at least one operation, which is supported by both the software application and the file access service, from the first list, and
      in response to the software application selecting the second list, establishing, to perform the second list of operations on the at least one file, a first direct communication link between the software application and the at least one file access service.

2. The method as described in claim 1, wherein the first list of operations is generated based on one or more operations that are identified as being supported by the at least one file access service.

3. The method as described in claim 1, further comprising, provided the software application is authorized to access a second file of the one or more files:
   communicating another list of operations for receipt by the software application, wherein the another list is generated specifically for the second file and the first list is generated specifically for the at least one file.

4. The method as described in claim 3, further comprising:
   establishing, to perform the another list of operations on the second file, a second direct communication link between the software application and the at least one file access service, wherein the file system stores the second file.

5. The method as described in claim 1, wherein the first direct communication link is formed using at least one protocol that enables communications between the software application and the at least one file access service to perform at least one operation of the second list of operations.

6. The method as described in claim 5, wherein the at least one operation enables the software application to perform a file collaboration operation on the at least one file.

7. The method as described in claim 1, wherein the at least one file is a remotely-stored file, and the file system is a cloud-based file system.

8. A computing device configured to enable a software application to perform an operation on a file stored on a file system while enforcing privacy measures at the computing device, the computing device comprising:
 at least one processor; and
 at least one memory configured to store instructions that, when executed by the at least one processor, cause the computing device to carry out steps that include:
  receiving, from a file browser, a selection of at least one file of one or more files made accessible by at least one file access service of one or more file access services, wherein the at least one file access service is associated with the file system storing the at least one file, and the file browser executes in a mode such that the software application cannot identify any content displayed within the file browser; and
  in response to determining that the software application is authorized to access the at least one file:
   identifying a first list of operations, to be performed on the at least one file, that the at least one file access service supports,
   communicating the first list of operations for receipt by the software application, wherein the software application performs an identification procedure to select, from the first list, a second list of operations to be performed on the at least one file stored at the file system, wherein the second list includes at least one operation, which is supported by both the software application and the file access service, from the first list, and
   in response to the software application selecting the second list, establishing, to perform the second list of operations on the at least one file, a first direct communication link between the software application and the at least one file access service.

9. The computing device as described in claim 8, wherein the first list of operations is generated based on one or more operations that are identified as being supported by the at least one file access service.

10. The computing device as described in claim 8, wherein the steps further include, provided the software application is authorized to access a second file of the one or more files:
 communicating another list of operations for receipt by the software application, wherein the another list is generated specifically for the second file and the first list is generated specifically for the at least one file.

11. The computing device as described in claim 10, wherein the steps further include:
 establishing, to perform the another list of operations on the second file, a second direct communication link between the software application and the at least one file access service, wherein the file system stores the second file.

12. The computing device as described in claim 8, wherein the first direct communication link is formed using at least one protocol that enables communications between the software application and the at least one file access service to perform at least one operation of the second list of operations.

13. The computing device as described in claim 12, wherein the at least one operation enables the software application to perform a file collaboration operation on the at least one file.

14. The computing device as described in claim 8, wherein the at least one file is a remotely-stored file, and the file system is a cloud-based file system.

15. At least one non-transitory computer readable storage medium configured to store instructions that, when executed by at least one processor included in a computing device, cause the computing device to perform an operation on a file stored on a file system while enforcing privacy measures at the computing device, by carrying out steps that include:
 receiving, from a file browser, a selection of at least one file of one or more files made accessible by at least one file access service of one or more file access services, wherein the at least one file access service is associated with the file system storing the at least one file, and the file browser executes in a mode such that a software application cannot identify any content displayed within the file browser; and
 in response to determining that the software application is authorized to access the at least one file:
  identifying a first list of operations, to be performed on the at least one file, that the at least one file access service supports,
  communicating the first list of operations for receipt by the software application, wherein the software application performs an identification procedure to select, from the first list, a second list of operations to be performed on the at least one file stored at the file system, wherein the second list includes at least one operation, which is supported by both the software application and the file access service, from the first list, and
  in response to the software application selecting the second list, establishing, to perform the second list of operations on the at least one file, a first direct communication link between the software application and the at least one file access service.

16. The at least one non-transitory computer readable storage medium as described in claim 15, wherein the first list of operations is generated based on one or more operations that are identified as being supported by the at least one file access service.

17. The at least one non-transitory computer readable storage medium as described in claim 15, wherein the steps further comprise, provided the software application is authorized to access a second file of the one or more files:
 communicating another list of operations for receipt by the software application, wherein the another list is generated specifically for the second file and the first list is generated specifically for the at least one file.

18. The at least one non-transitory computer readable storage medium as described in claim 17, wherein the steps further include:
 establishing, to perform the another list of operations on the second file, a second direct communication link between the software application and the at least one file access service, wherein the file system stores the second file.

19. The at least one non-transitory computer readable storage medium as described in claim 15, wherein the first direct communication link is formed using at least one protocol that enables communications between the software application and the at least one file access service to perform at least one operation of the second list of operations.

20. The at least one non-transitory computer readable storage medium as described in claim 19, wherein the at least one operation enables the software application to perform a file collaboration operation on the at least one file.

* * * * *